US012043265B2

(12) United States Patent
Homma et al.

(10) Patent No.: US 12,043,265 B2
(45) Date of Patent: Jul. 23, 2024

(54) SAFETY DRIVE ASSIST APPARATUS

(71) Applicant: SUBARU CORPORATION, Tokyo (JP)

(72) Inventors: Takuya Homma, Tokyo (JP); Tsukasa Mikuni, Tokyo (JP); Toru Kato, Tokyo (JP); Ryota Nakamura, Tokyo (JP); Masatoshi Tsuge, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 283 days.

(21) Appl. No.: 17/547,797

(22) Filed: Dec. 10, 2021

(65) Prior Publication Data

US 2022/0194388 A1 Jun. 23, 2022

(30) Foreign Application Priority Data

Dec. 22, 2020 (JP) ................................. 2020-212600
Oct. 29, 2021 (JP) ................................. 2021-178200

(51) Int. Cl.
*B60W 40/08* (2012.01)
*B60W 50/16* (2020.01)
(Continued)

(52) U.S. Cl.
CPC ............ *B60W 40/08* (2013.01); *B60W 50/16* (2013.01); *G06V 20/597* (2022.01); *G06V 40/10* (2022.01);
(Continued)

(58) Field of Classification Search
CPC ................. B60W 40/08; B60W 50/16; B60W 2540/229; B60W 2540/221;
(Continued)

(56) References Cited

U.S. PATENT DOCUMENTS

| 2020/0218914 | A1* | 7/2020 | Ardelean | ................. B60Q 3/80 |
| 2021/0016805 | A1* | 1/2021 | Oba | ......................... A61B 5/18 |
| 2022/0032922 | A1* | 2/2022 | Lee | ..................... G08G 1/09623 |

FOREIGN PATENT DOCUMENTS

JP 2020-082906 A 6/2020

* cited by examiner

*Primary Examiner* — Navid Z. Mehdizadeh
*Assistant Examiner* — Shelley Marie Osterhout
(74) *Attorney, Agent, or Firm* — Rimon P.C.

(57) ABSTRACT

A safety drive assist apparatus includes an imaging unit, an information acquisition unit, a first determination processor, a second determination processor, and a control processor. The imaging unit captures an image of an occupant inside a vehicle. The information acquisition unit acquires information including biometric information of the occupant inside and outside the vehicle. The first determination processor and the second determination processor determine a physical fatigue level and a mental fatigue level of the occupant inside the vehicle, respectively, on the basis of the image of the occupant inside the vehicle captured by the imaging unit or the information including the biometric information of the occupant inside and outside the vehicle acquired by the information acquisition unit. The control processor controls a vehicle device on the basis of one or both of determination information obtained by the first determination processor, and determination information obtained by the second determination processor.

16 Claims, 17 Drawing Sheets

(51) Int. Cl.
*G06V 20/59* (2022.01)
*G06V 40/10* (2022.01)

(52) U.S. Cl.
CPC ... *B60W 2420/403* (2013.01); *B60W 2540/22* (2013.01); *B60W 2540/221* (2020.02); *B60W 2540/229* (2020.02)

(58) Field of Classification Search
CPC .......... B60W 2420/42; B60W 2540/22; G06V 40/10; G06V 20/597
See application file for complete search history.

| INFORMATION ACQUISITION UNIT OUTPUT ITEM | PHYSICAL FATIGUE | MENTAL FATIGUE |
|---|---|---|
| HEART RATE | | ○ |
| BLOOD-OXYGEN SATURATION | ○ | |
| HEART RATE VARIABILITY | | ○ |
| RESPIRATORY RATE | ○ | ○ |
| BODY TEMPERATURE | ○ | ○ |
| BLOOD PRESSURE | ○ | ○ |
| HEMOGLOBIN LEVEL | ○ | ○ |
| ACTIVITY AMOUNT | ○ | |
| NUMBER OF TIMES OF BLINKING | ○ | ○ |
| OPENING DEGREE OF EYE | ○ | ○ |
| SLEEP DURATION | ○ | ○ |
| NUMBER OF TIMES OF ROLLING WHILE SLEEPING | ○ | ○ |
| SLEEP STATE | ○ | ○ |
| REST DURATION | ○ | ○ |
| VEHICLE EXTERNAL ENVIRONMENT | ○ | ○ |

FIG. 4

| INFORMATION ACQUISITION UNIT OUTPUT ITEM | DETERMINATION RESULT OF FIRST DETERMINATION PROCESSOR | INFORMATION ACQUISITION UNIT OUTPUT ITEM | DETERMINATION RESULT OF SECOND DETERMINATION PROCESSOR |
|---|---|---|---|
| HEART RATE | — | HEART RATE | 2 |
| BLOOD-OXYGEN SATURATION | 4 | BLOOD-OXYGEN SATURATION | — |
| HEART RATE VARIABILITY | — | HEART RATE VARIABILITY | 1 |
| RESPIRATORY RATE | 3 | RESPIRATORY RATE | 3 |
| BODY TEMPERATURE | 1 | BODY TEMPERATURE | 1 |
| BLOOD PRESSURE | 3 | BLOOD PRESSURE | 3 |
| HEMOGLOBIN LEVEL | 3 | HEMOGLOBIN LEVEL | 3 |
| ACTIVITY AMOUNT | 2 | ACTIVITY AMOUNT | — |
| NUMBER OF TIMES OF BLINKING | 2 | NUMBER OF TIMES OF BLINKING | 2 |
| OPENING DEGREE OF EYE | 4 | OPENING DEGREE OF EYE | 4 |
| SLEEP DURATION | 4 | SLEEP DURATION | 4 |
| NUMBER OF TIMES OF ROLLING WHILE SLEEPING | 3 | NUMBER OF TIMES OF ROLLING WHILE SLEEPING | 3 |
| SLEEP STATE | 3 | SLEEP STATE | 4 |
| REST DURATION | 3 | REST DURATION | 3 |
| VEHICLE EXTERNAL ENVIRONMENT | 2 | VEHICLE EXTERNAL ENVIRONMENT | 2 |

FIG. 5

| VEHICLE DEVICE | OPERATION EXAMPLE |
| --- | --- |
| VISUAL STIMULATION DEVICE | OPEN SUNROOF IN DAYTIME, CHANGE INTERIOR LIGHT TO BLUE LIGHT IN NIGHTTIME |
| AUDITORY STIMULATION DEVICE | PLAY NATURAL SOUND |
| SOMATOSENSORY STIMULATION DEVICE | PRESENT HOW TO PERFORM MASSAGE PROMOTING RECOVERY FROM FATIGUE |
| OLFACTORY STIMULATION DEVICE | GENERATE SCENT OF AROMA OIL PROMOTING RECOVERY FROM FATIGUE |

FIG. 6

| INFORMATION ACQUISITION UNIT OUTPUT ITEM | DETERMINATION RESULT OF SECOND DETERMINATION PROCESSOR |
|---|---|
| HEART RATE | 4 |
| BLOOD-OXYGEN SATURATION | |
| HEART RATE VARIABILITY | 1 |
| RESPIRATORY RATE | 3 |
| BODY TEMPERATURE | 1 |
| BLOOD PRESSURE | 3 |
| HEMOGLOBIN LEVEL | 3 |
| ACTIVITY AMOUNT | |
| NUMBER OF TIMES OF BLINKING | 2 |
| OPENING DEGREE OF EYE | 4 |
| SLEEP DURATION | |
| NUMBER OF TIMES OF ROLLING WHILE SLEEPING | |
| SLEEP STATE | |
| REST DURATION | |
| VEHICLE EXTERNAL ENVIRONMENT | 2 |

| INFORMATION ACQUISITION UNIT OUTPUT ITEM | DETERMINATION RESULT OF THIRD DETERMINATION PROCESSOR |
|---|---|
| HEART RATE | |
| BLOOD-OXYGEN SATURATION | |
| HEART RATE VARIABILITY | |
| RESPIRATORY RATE | |
| BODY TEMPERATURE | |
| BLOOD PRESSURE | |
| HEMOGLOBIN LEVEL | |
| ACTIVITY AMOUNT | 4 |
| NUMBER OF TIMES OF BLINKING | |
| OPENING DEGREE OF EYE | |
| SLEEP DURATION | 4 |
| NUMBER OF TIMES OF ROLLING WHILE SLEEPING | 3 |
| SLEEP STATE | 4 |
| REST DURATION | 3 |
| VEHICLE EXTERNAL ENVIRONMENT | |

FIG. 13

| INFORMATION ACQUISITION UNIT OUTPUT ITEM | DETERMINATION RESULT OF FIRST DETERMINATION PROCESSOR |
|---|---|
| HEART RATE | |
| BLOOD-OXYGEN SATURATION | 4 |
| HEART RATE VARIABILITY | |
| RESPIRATORY RATE | 3 |
| BODY TEMPERATURE | 1 |
| BLOOD PRESSURE | 3 |
| HEMOGLOBIN LEVEL | 3 |
| ACTIVITY AMOUNT | |
| NUMBER OF TIMES OF BLINKING | 2 |
| OPENING DEGREE OF EYE | 4 |
| SLEEP DURATION | |
| NUMBER OF TIMES OF ROLLING WHILE SLEEPING | |
| SLEEP STATE | |
| REST DURATION | |
| VEHICLE EXTERNAL ENVIRONMENT | 2 |

| INFORMATION ACQUISITION UNIT OUTPUT ITEM | DETERMINATION RESULT OF THIRD DETERMINATION PROCESSOR |
|---|---|
| HEART RATE | |
| BLOOD-OXYGEN SATURATION | |
| HEART RATE VARIABILITY | |
| RESPIRATORY RATE | |
| BODY TEMPERATURE | |
| BLOOD PRESSURE | |
| HEMOGLOBIN LEVEL | |
| ACTIVITY AMOUNT | 4 |
| NUMBER OF TIMES OF BLINKING | |
| OPENING DEGREE OF EYE | |
| SLEEP DURATION | 4 |
| NUMBER OF TIMES OF ROLLING WHILE SLEEPING | 3 |
| SLEEP STATE | 4 |
| REST DURATION | 3 |
| VEHICLE EXTERNAL ENVIRONMENT | |

FIG. 16

SAFETY DRIVE ASSIST APPARATUS

CROSS-REFERENCE TO RELATED APPLICATIONS

The present application claims priority from Japanese Patent Application No. 2020-212600 filed on Dec. 22, 2020, and 2021-178200 filed on Oct. 29, 2021, the entire contents of each which are hereby incorporated by reference.

BACKGROUND

The technology relates to a safety drive assist apparatus.

In general, at a driving start timing of a vehicle, it is difficult to determine physical and mental fatigue, etc. of an occupant, including a driver, inside the vehicle and to also determine a degree of the physical and mental fatigue, etc. of the occupant.

Meanwhile, the following technique is disclosed regarding sleepiness of a driver. That is, a sleepiness level of the driver is detected, and whether awakening assistance for the driver is necessary is determined on the basis of the detected sleepiness level. In a case where the awakening assistance is necessary, a driver's seat is vibrated at least in some time slots with use of a vibration wave in which a first frequency promoting muscle tone and a second frequency suppressing muscle tone are imposed on each other. Such a technique is disclosed, for example, in Japanese Unexamined Patent Application Publication (JP-A) No. 2020-082906.

SUMMARY

An aspect of the technology provides a safety drive assist apparatus to be applied to a vehicle. The safety drive assist apparatus includes an imaging unit, an information acquisition unit, a first determination processor, a second determination processor, and a control processor. The imaging unit is configured to capture an image of an occupant inside the vehicle. The information acquisition unit is configured to acquire information including biometric information of the occupant inside and outside the vehicle. The first determination processor is configured to determine a physical fatigue level of the occupant inside the vehicle on the basis of the image of the occupant inside the vehicle captured by the imaging unit or the information including the biometric information of the occupant inside and outside the vehicle acquired by the information acquisition unit. The second determination processor is configured to determine a mental fatigue level of the occupant inside the vehicle on the basis of the image of the occupant inside the vehicle captured by the imaging unit or the information including the biometric information of the occupant inside and outside the vehicle acquired by the information acquisition unit. The control processor is configured to control a vehicle device of the vehicle on the basis of one or both of first determination information obtained by the first determination processor upon determining the physical fatigue level, and second determination information obtained by the second determination processor upon determining the mental fatigue level.

An aspect of the technology provides a safety drive assist apparatus to be applied to a vehicle. The safety drive assist apparatus includes an imaging unit and circuitry. The imaging unit is configured to capture an image of an occupant inside a vehicle. The circuitry is configured to acquire information including biometric information of the occupant inside and outside the vehicle. The circuitry is configured to determine a physical fatigue level of the occupant inside the vehicle on the basis of the image of the occupant inside the vehicle captured by the imaging unit or the acquired information including the biometric information of the occupant inside and outside the vehicle. The circuitry is configured to determine a mental fatigue level of the occupant inside the vehicle on the basis of the image of the occupant inside the vehicle captured by the imaging unit or the acquired information including the biometric information of the occupant inside and outside the vehicle. The circuitry is configured to control a vehicle device of the vehicle on the basis of one or both of first determination information regarding the physical fatigue level, and second determination information regarding the mental fatigue level.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4 is a diagram illustrating an example of a relationship between physical or mental fatigue and items of outputs from an information acquisition unit of the safety drive assist apparatus according to one example embodiment of the technology.

FIG. 5 is a diagram illustrating an example of determination information obtained by a first determination processor or a second determination processor of the safety drive assist apparatus according to one example embodiment of the technology.

FIG. 6 is a diagram illustrating an example of operation to be performed by vehicle devices of the safety drive assist apparatus according to one example embodiment of the technology.

FIG. 13 is a diagram illustrating an example of determination information obtained by a second determination processor or a third determination processor of the safety drive assist apparatus according to one example embodiment of the technology.

FIG. 16 is a diagram illustrating an example of determination information obtained by a first determination processor or a third determination processor of the safety drive assist apparatus according to one example embodiment of the technology.

DETAILED DESCRIPTION

Figure 1:
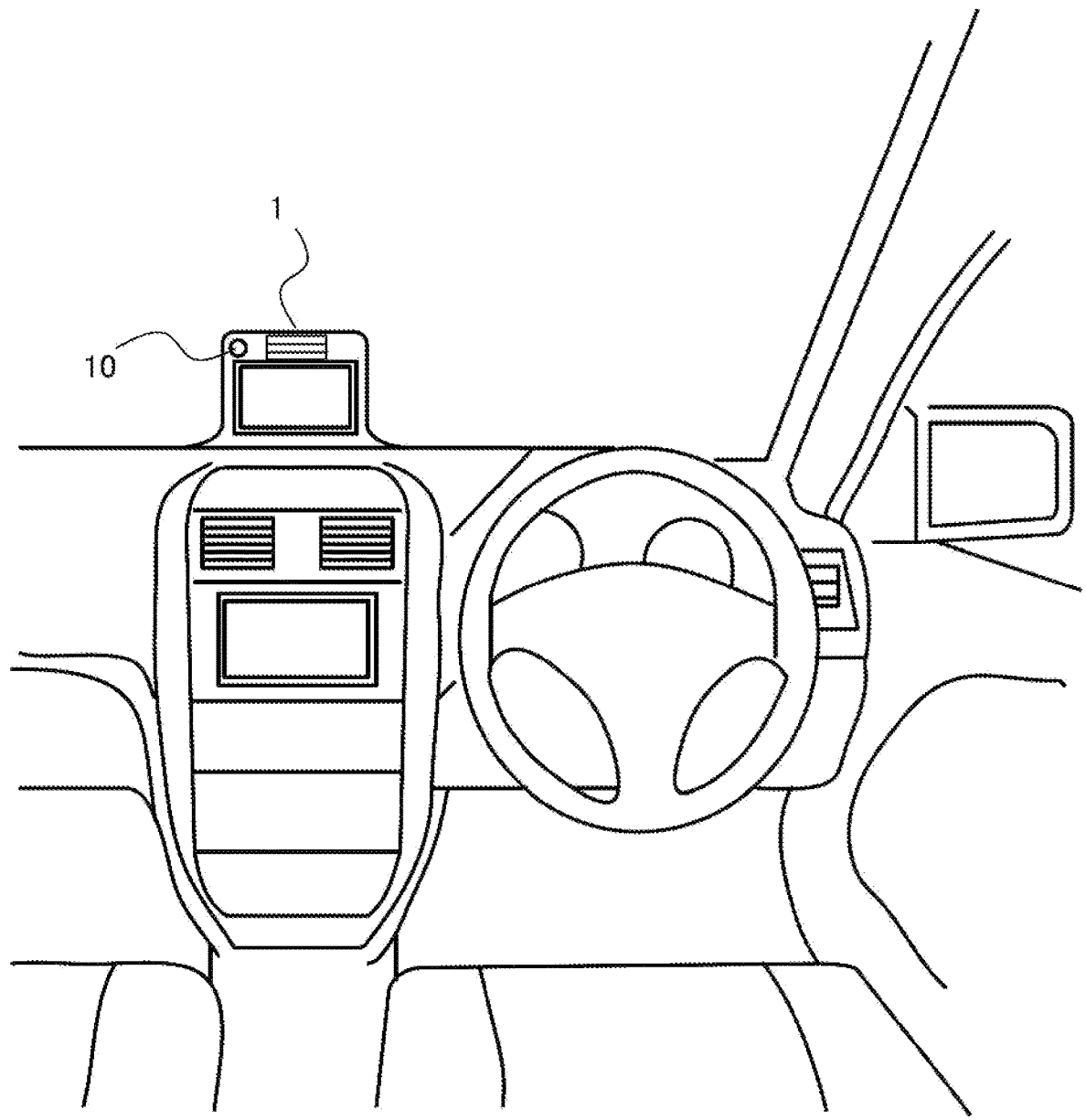
FIG. 1 is a diagram illustrating an example of a disposed state of a safety drive assist apparatus according to one example embodiment of the technology.

In a technique disclosed in JP-A No. 2020-082906, sleepiness is the only parameter used for determining a state of a driver. In addition, necessity of awakening assistance is uniquely determined on the basis of whether a sleepiness level is higher than a predetermined threshold level. It is therefore difficult to appropriately select an awakening method or appropriately adjust a degree of an awakening process in accordance with physical and mental fatigue levels of an occupant based on a plurality of determination factors.

It is desirable to provide a safety drive assist apparatus that makes it possible to appropriately select an awakening method and appropriately adjust a degree of an awakening process in accordance with physical and mental fatigue levels of an occupant based on a plurality of determination factors, and to thereby reduce a possibility of accident occurrence due to fatigue.

In the following, some example embodiments of the technology are described with reference to FIGS. 1 to 17. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Referring to FIGS. 1 to 6, a safety drive assist apparatus 1 according to a first example embodiment of the technology is described.

Figure 2:
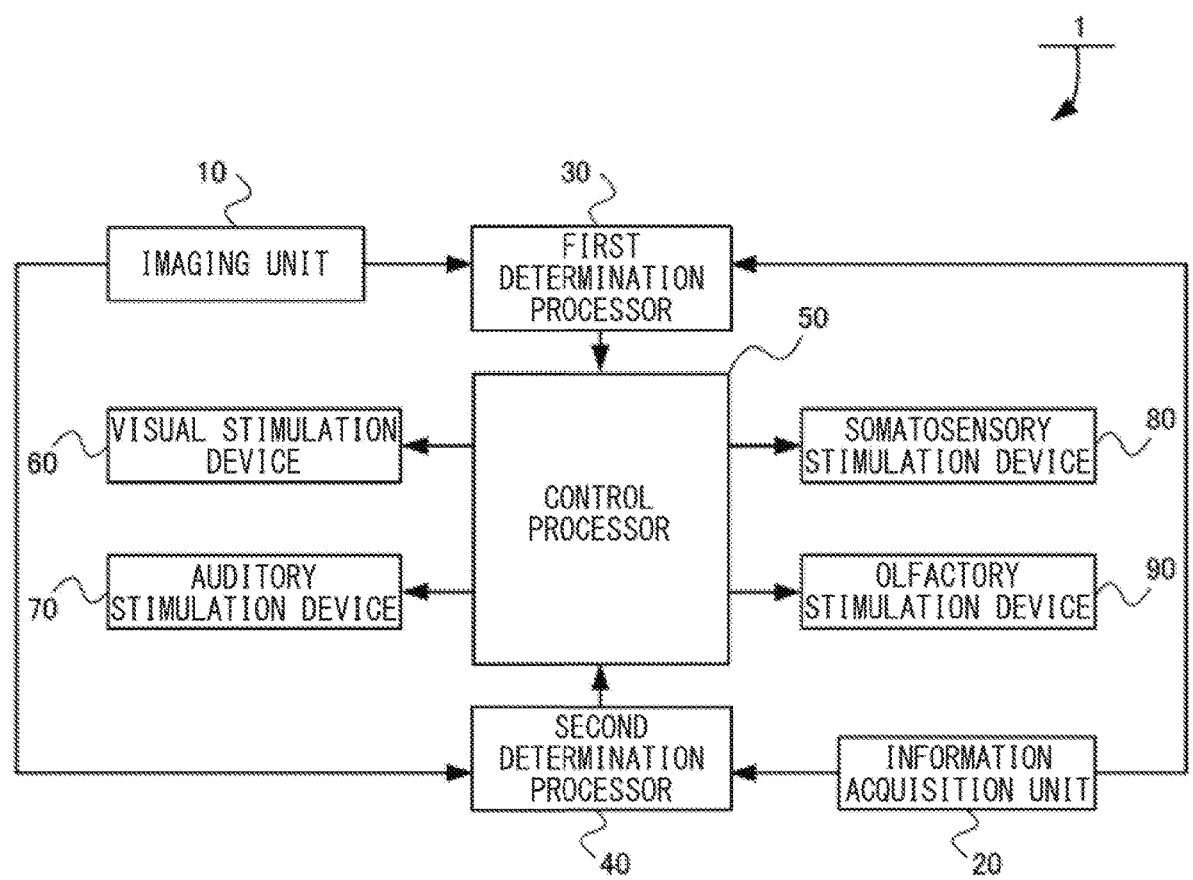
FIG. 2 is a diagram illustrating an example of a configuration of the safety drive assist apparatus according to one example embodiment of the technology.

As illustrated in FIG. 1, the safety drive assist apparatus 1 according to the first example embodiment may be provided, for example, at a middle part in front of a driver's seat inside a vehicle. As illustrated in FIG. 2 which will be described later, in the safety drive assist apparatus 1, a control processor 50 may control a vehicle device on the basis of a physical fatigue level of an occupant inside the vehicle determined by a first determination processor 30, a mental fatigue level of the occupant inside the vehicle determined by a second determination processor 40, or both. The first determination processor 30 and the second determination processor 40 may determine the physical fatigue level and the mental fatigue level of the occupant inside the vehicle, respectively, on the basis of an image of the occupant captured by an imaging unit 10 or information including biometric information of the occupant inside and outside the vehicle acquired by an information acquisition unit 20.

Details of the configuration will be described later.

[Configuration of Safety Drive Assist Apparatus 1]

As illustrated in FIG. 2, the safety drive assist apparatus 1 according to the first example embodiment may include the imaging unit 10, the information acquisition unit 20, the first determination processor 30, the second determination processor 40, the control processor 50, a visual stimulation device 60, an auditory stimulation device 70, a somatosensory stimulation device 80, and an olfactory stimulation device 90.

In one embodiment, the visual stimulation device 60, the auditory stimulation device 70, the somatosensory stimulation device 80, and the olfactory stimulation device 90 may each serve as a "vehicle device". Hereinafter, the visual stimulation device 60, the auditory stimulation device 70, the somatosensory stimulation device 80, and the olfactory stimulation device 90 are sometimes collectively referred to as "vehicle devices 60, 70, 80, and 90".

Note that, in the first example embodiment, the vehicle devices 60, 70, 80, and 90 are described as components included in the safety drive assist apparatus 1; however, the vehicle devices 60, 70, 80, and 90 may each be an independent apparatus that is operable also in accordance with intention of the occupant.

The imaging unit 10 may include, for example, a built-in imaging device such as a charge coupled device (CCD) or a complementary metal oxide semiconductor (CMOS) image sensor (CIS). The imaging unit 10 may output an image, including a moving image and a still image, of the occupant inside the vehicle captured by the imaging device.

In one example, the imaging unit 10 may be a camera to be used only as the imaging unit 10. However, for example, in a case where an occupant recognition apparatus is provided, an imaging unit of the occupant recognition apparatus may be used as the imaging unit 10. In one example, the imaging unit 10 may include both an optical camera and a near-infrared ray camera.

The information acquisition unit 20 may be provided inside or outside of the vehicle. The information acquisition unit 20 acquires, for example, biometric information of the occupant. Non-limiting examples of the biometric information may include vital data of each occupant.

Non-limiting examples of the information acquisition unit 20 provided inside the vehicle may include a unit mounted on the vehicle and a unit worn or carried by the occupant like a smartwatch or a smartphone.

Non-limiting examples of the information acquisition unit 20 provided outside the vehicle may include a fixed unit and a movable unit provided at the occupant's home. Non-limiting examples of the fixed unit may include a unit provided on a ceiling or a wall of a bedroom, a stationary unit, and a unit embedded in a bed mattress. Non-limiting examples of the movable unit may include a unit mounted on a robot or the like.

In addition, the information acquisition unit 20 that acquires vehicle external environment information including, without limitation, weather, an outside temperature, humidity, and date and time may be provided. In addition, the information acquisition unit 20 that acquires information including, without limitation, traffic congestion information, construction zone information, accident information, and malfunctioning vehicle information from an external apparatus or the like may be provided.

The first determination processor 30 may determine the physical fatigue level of the occupant inside the vehicle on the basis of information obtained from the imaging unit 10, the information acquisition unit 20, or both.

For example, the first determination processor 30 may quantify a plurality of levels from low to high regarding each piece of information obtained from the imaging unit 10 or the information acquisition unit 20, and thereby determine the physical fatigue level of the occupant inside the vehicle. For example, the plurality of levels may be quantified as levels 1 to 5 as described in FIG. 5. The quantification of the levels may use unique thresholds. The unique thresholds may be values suggested by many academic studies, etc.

As illustrated in FIG. 4, non-limiting examples of the information to be obtained from the imaging unit 10 may include an opening degree of an eye, the number of times of blinking, sleep duration, rest duration, and the number of times of rolling while sleeping.

Non-limiting examples of the information to be obtained from the information acquisition unit 20 may include a heart rate, blood-oxygen saturation, heart rate variability, a respiratory rate, a body temperature, a blood pressure, a hemoglobin level, an activity amount, the number of times of rolling while sleeping, a sleep state, the sleep duration, and the vehicle external environment information.

The opening degree of an eye may serve as an example index used for detecting a drowsy state. The number of times of blinking may serve as an example index used for detecting an eye strain degree. The number of times of rolling while sleeping, a REM sleep state, a non-REM sleep state, and the like may serve as example indices used for detecting the sleep state including quality of sleep.

The second determination processor 40 may determine the mental fatigue level of the occupant inside the vehicle on the basis of information obtained from the imaging unit 10, the information acquisition unit 20, or both.

For example, the second determination processor 40 may quantify a plurality of levels from low to high regarding each piece of information obtained from the imaging unit 10 or the information acquisition unit 20, and thereby determine the mental fatigue level of the occupant inside the vehicle. For example, the plurality of levels may be quantified as levels 1 to 5 as described in FIG. 5. The quantification of the levels may use unique thresholds. The unique thresholds may be values suggested by many academic studies, etc.

The control processor 50 may include unillustrated known units including, without limitation, a central processing unit (CPU), a random-access memory (RAM), a read-only memory (ROM), and an input-output (I/O) bus. The control processor 50 may execute a general control of the safety drive assist apparatus 1 in accordance with a control program stored in the ROM.

According to the first example embodiment, the control processor 50 may execute a control of each of the vehicle devices 60, 70, 80, and 90 that are mounted on the vehicle and promote awakening and/or recovery from fatigue of the occupant.

For example, the control processor 50 may control each of the vehicle devices 60, 70, 80, and 90 that promote awakening and/or recovery from fatigue of the occupant, on the basis of determination information obtained by the first determination processor 30, determination information obtained by the second determination processor 40, or both.

A control method is described in detail later.

The visual stimulation device 60 may be one of the vehicle devices 60, 70, 80, and 90 that promote awakening and/or recovery from fatigue of the occupant. The visual stimulation device 60 may include, for example but not limited to, a light source inside the vehicle and a sunroof open and close mechanism. Non-limiting examples of the light source inside the vehicle may include an interior light, a light source of a meter, a light source of a head-up display (HUD), and a light source of a monitor.

For example, during nighttime, the visual stimulation device 60 may turn on the interior light and change luminance, chroma, and the like of the interior light in accordance with a control signal supplied from the control processor 50.

For example, during daytime, the visual stimulation device 60 may perform operation of causing a sunroof to operate and thereby taking outside light into a vehicle compartment. In one example, the visual stimulation device 60 may perform a light adjustment control with use of a glass window and thereby control the amount of outside light taken into the vehicle compartment.

The auditory stimulation device 70 may be one of the vehicle devices 60, 70, 80, and 90 that promote awakening and/or recovery from fatigue of the occupant. The auditory stimulation device 70 may include, for example but not limited to, an on-vehicle acoustic unit.

For example, the auditory stimulation device 70 may output a warning sound, a warning message, a music, an ambient sound, a preregistered human voice, an audio sound promoting an autonomous sensory meridian response (ASMR), and/or any other suitable sound.

Here, the ASMR is a human reaction based on a sense such as sight or hearing and is a comfortable brain-tingling-like sensation. Non-limiting examples of the audio sound promoting the ASMR may include: a mastication sound obtained by recording a crisp sound of eating food; a binaurally recorded realistic audio sound that allows a person to feel as if he or she is actually having his or her ear cleaned; a tapping sound of tapping a keyboard, a desk, or the like; and a natural sound using an environmental sound such as a sound of rain, a murmur of a stream, or a sound of waves.

The somatosensory stimulation device 80 may be one of the vehicle devices 60, 70, 80, and 90 that promote awakening and/or recovery from fatigue of the occupant. The somatosensory stimulation device 80 may include, for example but not limited to, a vibration mechanism that vibrates a seating surface or a back surface of a seat and a vibration mechanism that vibrates a headrest. The somatosensory stimulation device 80 may also be configured to output an image or an audio sound regarding how to perform massage for recovery from fatigue of each target part.

The olfactory stimulation device 90 may be one of the vehicle devices 60, 70, 80, and 90 that promote awakening and/or recovery from fatigue of the occupant. The olfactory stimulation device 90 may include, for example but not limited to, an aroma generation unit.

For example, the olfactory stimulation device 90 may generate a scent that promotes awakening of a fatigue person, such as a scent of mint or an aroma oil. For example, the olfactory stimulation device 90 may generate: a scent that increases concentration, such as a scent of rosemary, bergamot, geranium, peppermint, eucalyptus, or lemon; a scent that promotes relaxation such as a scent of lavender, chamomile, juniper, neroli, yuzu, ylang-ylang, or rosewood; or a scent that promotes recovery from fatigue such as a scent of sweet marjoram, rosemary, ginger, juniper, marjoram, lavender, or chamomile.

[Process of Safety Drive Assist Apparatus 1]

Referring to FIGS. 3 to 6, a process to be performed by the safety drive assist apparatus 1 according to the first example embodiment is described.

Figure 3:
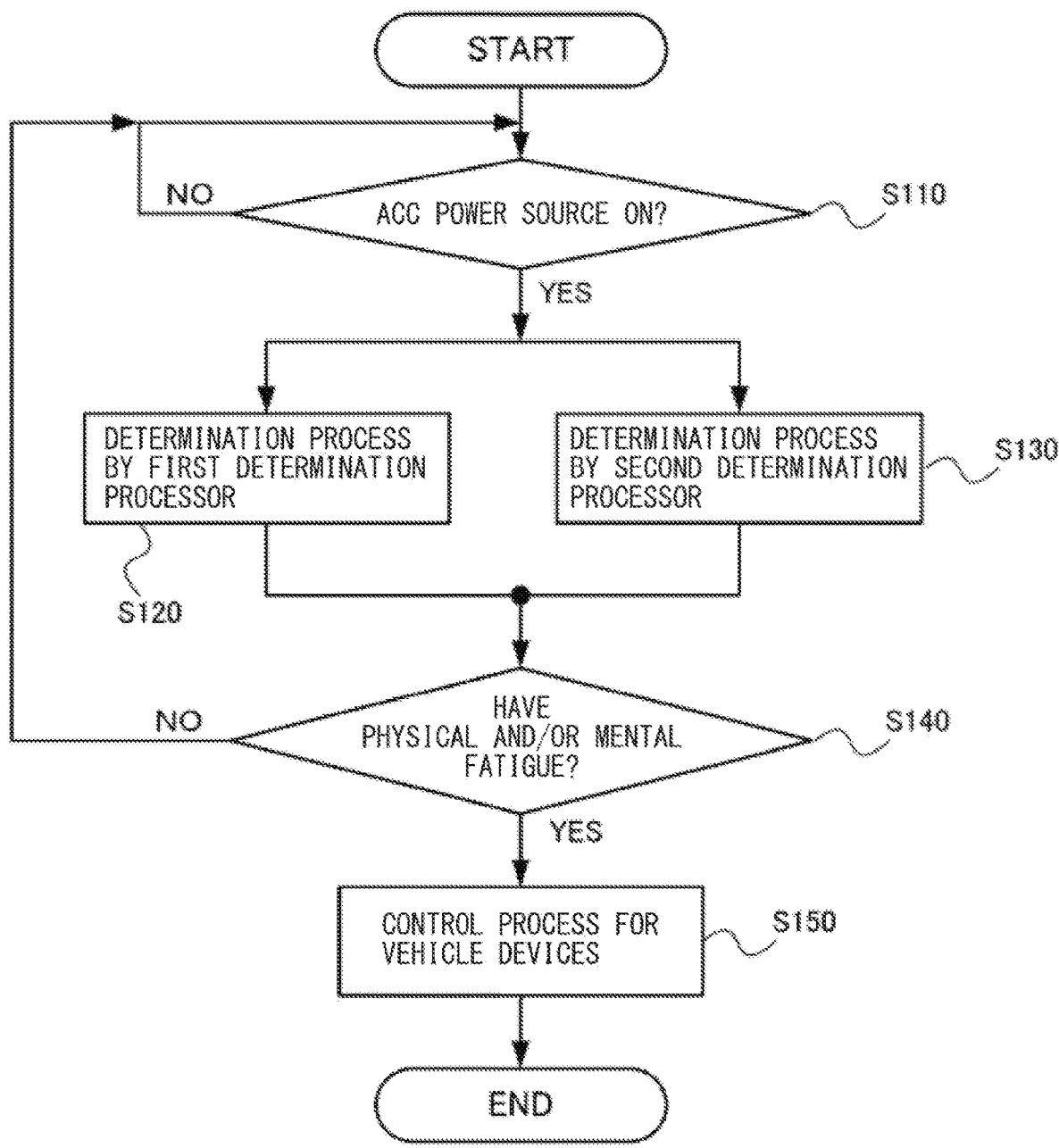
FIG. 3 is a flowchart illustrating an example of a process to be performed by the safety drive assist apparatus according to one example embodiment of the technology.

As illustrated in FIG. 3, the control processor 50 may first determine whether an accessory power source (ACC power source) is in an ON state (step S110).

In a case where the control processor 50 determines that the ACC power source is not in the ON state (NO in step S110), the safety drive assist apparatus 1 may transition to a standby mode.

In a case where the control processor 50 determines that the ACC power source is in the ON state (YES in step S110), the first determination processor 30 and the second determination processor 40 may each execute a determination process on the basis of information obtained from the information acquisition unit 20, and supply determination information, i.e., information related to the determination process, to the control processor 50 (steps S120 and S130).

Here, as illustrated in FIG. 4, the first determination processor 30 and the second determination processor 40 may each perform the determination process regarding respective items of outputs from the information acquisition unit 20.

For example, the first determination processor 30 may determine the physical fatigue level of the occupant regarding one or more pieces of information among, for example but not limited to, the blood-oxygen saturation, the respiratory rate, the body temperature, the blood pressure, the hemoglobin level, the activity amount, the number of times of blinking, the opening degree of an eye, the sleep duration, the number of times of rolling while sleeping, the sleep state, the rest duration, and the vehicle external environment information.

For example, the second determination processor 40 may determine the mental fatigue level of the occupant regarding one or more pieces of information among, for example but not limited to, the heart rate, the heart rate variability, the respiratory rate, the body temperature, the blood pressure, the hemoglobin level, the number of times of blinking, the opening degree of an eye, the sleep duration, the number of times of rolling while sleeping, the sleep state, the rest duration, and the vehicle external environment information.

Note that, regarding the five evaluation levels used by the first determination processor 30 and the second determination processor 40 illustrated in FIG. 5, the level may be set higher as the numerical value of the item is greater for the heart rate, the blood-oxygen saturation, the heart rate variability, the respiratory rate, the body temperature, the blood pressure, the hemoglobin level, the activity amount, and the number of times of blinking. The level may be set higher as the numerical value of the item is smaller for the opening degree of an eye, the sleep duration, the number of times of rolling while sleeping, the sleep state, and the rest duration. For the vehicle external environment information, the level may be set higher as the situation is worse.

The control processor 50 may determine whether the occupant is experiencing physical fatigue, mental fatigue, or both on the basis of the determination information from the first determination processor 30, the second determination processor 40, or both (step S140).

For example, the control processor 50 may determine that the occupant is experiencing the physical fatigue in a case where the determination information obtained from the first determination processor 30 includes an information acquisition unit output item at a predetermined threshold level or higher. The predetermined threshold level may be, for example, level 4 of the five levels described in FIG. 5. For example, the control processor 50 may determine that the occupant is experiencing the mental fatigue in a case where the determination information obtained from the second determination processor 40 includes an information acquisition unit output item at a predetermined threshold level or higher, e.g., at level 4 of the five levels described in FIG. 5.

For example, the control processor 50 may determine that the occupant is experiencing both the physical fatigue and the mental fatigue in a case where the determination information obtained from the first determination processor 30 and the determination information obtained from the second determination processor 40 each include an information acquisition unit output item at a predetermined threshold level or higher, e.g., at level 4 of the five levels described in FIG. 5.

In the example described in FIG. 5, as the determination information obtained from the first determination processor 30, the items of the blood-oxygen saturation, the opening degree of an eye, the sleep duration, and the rest duration are at the predetermined threshold level or higher. As the determination information obtained from the second determination processor 40, the items of the opening degree of an eye, the sleep duration, and the rest duration are at the predetermined threshold level or higher. Accordingly, the control processor 50 may determine that the occupant of the vehicle is experiencing both the physical fatigue and the mental fatigue.

For example, in a case where the number of the information acquisition unit output items at a predetermined threshold level or higher based on the five-level evaluation, e.g., at level 4 or higher of the five levels described in FIG. 5, or in a case where a simple average or a weighted average of all of the information acquisition unit output items is calculated to determine the physical fatigue level and the mental fatigue level, a determination level found on the basis of the existing data analysis and academic findings may be set as a predetermined fatigue level (a predetermined level).

Note that the predetermined threshold level may be appropriately changeable. In addition, even if one information acquisition unit output item is under the predetermined threshold level, in a case where there is an effective method for improving the information acquisition unit output item, the effective method for improving the information acquisition unit output item may be executed as a precaution.

In a case where the control processor 50 determines that the occupant is not experiencing the physical fatigue, the mental fatigue, or both in step S140 (NO in step S140), the control processor 50 may cause the process to move to step S110.

In a case where the control processor 50 determines that the occupant is experiencing the physical fatigue, the mental fatigue, or both (YES in step S140), the control processor 50 may cause the process to move to step S150.

In step S150, the control processor 50 may execute a process of controlling the vehicle devices 60, 70, 80, and 90 that promote awakening and/or recovery from fatigue of the occupant, on the basis of the determination information from the first determination processor 30, the second determination processor 40, or both (step S150).

For example, in a case where the determination information from the first determination processor 30 and the second determination processor 40 is as listed in FIG. 5, as the determination information from the first determination processor 30, the items of the blood-oxygen saturation, the opening degree of an eye, the sleep duration, and the rest duration are at the predetermined level or higher, e.g., level 4 or higher of the five levels described in FIG. 5. As the determination information from the second determination processor 40, the items of the opening degree of an eye, the sleep duration, and the rest duration are at the predetermined level or higher, e.g., level 4 or higher of the five levels described in FIG. 5. Accordingly, for example, as described in FIG. 6, the control processor 50 may so control the visual stimulation device 60 that the visual stimulation device 60 brings the sunroof into an open state in a case of daytime, and changes the interior light to blue light in a case of nighttime.

In addition, for example, the control processor 50 may so control the auditory stimulation device 70 that the auditory stimulation device 70 plays a natural sound.

In addition, for example, the control processor 50 may so control the somatosensory stimulation device 80 that the somatosensory stimulation device 80 presents how to perform massage promoting recovery from fatigue by means of an image or an audio sound.

In addition, for example, the control processor 50 may so control the olfactory stimulation device 90 that the olfactory stimulation device 90 generates a scent of an aroma oil promoting recovery from fatigue. After the control processor 50 executes the process of controlling the vehicle devices 60, 70, 80, and 90, the control processor 50 may end the series of processes.

Other than controlling the visual stimulation device 60, the auditory stimulation device 70, the somatosensory stimulation device 80, and the olfactory stimulation device 90, the control processor 50 may switch a vehicle compartment ventilation mode to an outside air introduction mode and take in oxygen-rich air into the vehicle compartment to promote awakening of the occupant.

[Example Workings and Example Effects]

As described above, the safety drive assist apparatus 1 according to the first example embodiment includes the imaging unit 10, the information acquisition unit 20, the first determination processor 30, the second determination processor 40, and the control processor 50. The imaging unit 10 captures an image of the occupant inside the vehicle. The information acquisition unit 20 acquires the biometric information of the occupant inside and outside the vehicle. The first determination processor 30 determines the physical fatigue level of the occupant inside the vehicle. The second determination processor 40 determines the mental fatigue level of the occupant inside the vehicle. The control processor 50 controls the vehicle devices 60, 70, 80, and 90 on the basis of the determination information obtained by the first determination processor 30, the determination information obtained by the second determination processor 40, or both. The vehicle devices 60, 70, 80, and 90 may promote awakening and/or recovery from fatigue of the occupant.

That is, the first determination processor 30 may determine the physical fatigue level of the occupant inside the vehicle on the basis of the acquisition information of the imaging unit 10 capturing the image of the occupant inside the vehicle and the acquisition information of the information acquisition unit 20 acquiring the biometric information of the occupant inside and outside the vehicle. The second determination processor 40 may determine the mental fatigue level of the occupant inside the vehicle on the basis of the acquisition information of the imaging unit 10 capturing the image of the occupant inside the vehicle and the acquisition information of the information acquisition unit 20 acquiring the biometric information of the occupant inside and outside the vehicle.

In addition, the control processor 50 may control the vehicle devices 60, 70, 80, and 90 promoting the awakening and/or the recovery from fatigue of the occupant, on the basis of the determination information obtained by the first determination processor 30, the determination information obtained by the second determination processor 40, or both.

Accordingly, it is possible to promote awakening and/or recovery from fatigue of the occupant in accordance with the physical and mental fatigue levels of the occupant, and thereby reduce a possibility of accident occurrence due to fatigue.

Moreover, the control processor 50 may quantify the determination information obtained by the first determination processor 30 and the determination information obtained by the second determination processor 40, and control the vehicle devices 60, 70, 80, and 90 that promote awakening and/or recovery from fatigue of the occupant on the basis of the determination information obtained by the first determination processor 30, the determination information obtained by the second determination processor 40, or both. Accordingly, it is possible to appropriately select an awakening method and appropriately adjust a degree of an awakening process in accordance with the physical and mental fatigue levels of the occupant. As a result, it is possible to reduce the possibility of accident occurrence due to fatigue.

Moreover, the control processor 50 of the safety drive assist apparatus 1 according to the first example embodiment may control the plurality of vehicle devices 60, 70, 80, and 90 configured to respectively stimulate sight, hearing, a sense of touch, and a sense of smell of the occupant inside the vehicle.

Therefore, the control processor 50 may control the vehicle devices 60, 70, 80, and 90 that respectively stimulate the sight, the hearing, the sense of touch, and the sense of smell of the occupant inside the vehicle on the basis of the determination information obtained by the first determination processor 30, the determination information obtained by the second determination processor 40, or both. This makes it possible to appropriately select the awakening method and appropriately adjust the degree of the awakening process. As a result, it is possible to reduce the possibility of accident occurrence due to fatigue.

Moreover, in a case where there is an awakening method or a fatigue recovery method effective for a particular item of the acquisition items of the information acquisition unit 20, and where the determination level of the particular item is high, a control to execute the awakening method or the fatigue recovery method related to the particular item may be performed regardless of the comprehensive evaluation related to all of the items. Accordingly, it is possible to take an appropriate measure for awakening and/or fatigue recovery in accordance with the physical and mental fatigue levels of the occupant.

Moreover, in a case where the imaging unit 10 includes both the optical camera and the near-infrared ray camera, it is possible to acquire the image of the occupant at any time of day and night.

This makes it possible to precisely acquire information regarding the rest state of the occupant. As a result, it is possible to take a more appropriate measure for awakening and/or fatigue recovery in accordance with the physical and mental fatigue levels of the occupant.

Second Example Embodiment

Referring to FIGS. 7 to 10, a safety drive assist apparatus 1A according to a second example embodiment of the technology is described.

[Configuration of Safety Drive Assist Apparatus 1A]

Figure 7:
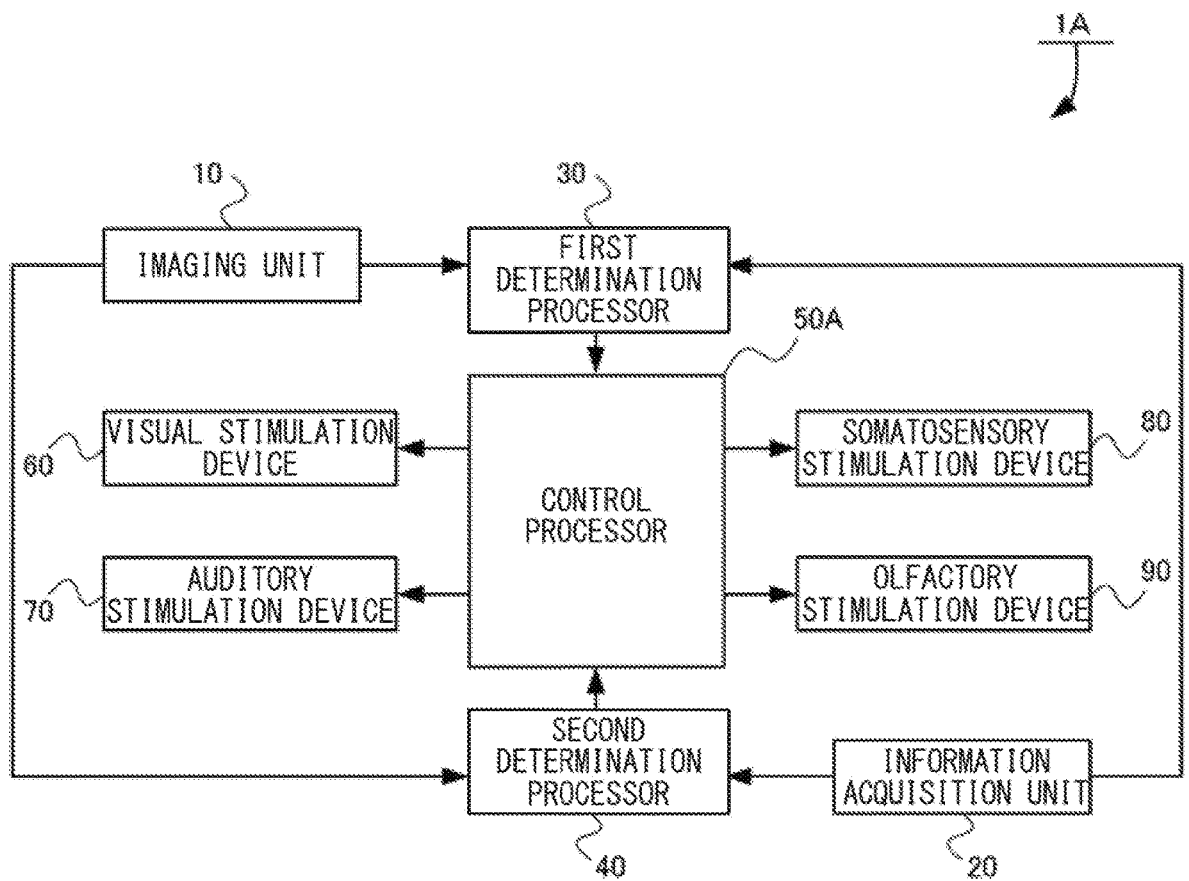
FIG. 7 is a diagram illustrating an example of a configuration of a safety drive assist apparatus according to one example embodiment of the technology.

As illustrated in FIG. 7, the safety drive assist apparatus 1A according to the second example embodiment may include the imaging unit 10, the information acquisition unit 20, the first determination processor 30, the second determination processor 40, a control processor 50A, the visual stimulation device 60, the auditory stimulation device 70, the somatosensory stimulation device 80, and the olfactory stimulation device 90.

Note that the components denoted with the same referential signs as those in the first example embodiment may serve as the same, and are therefore not described further in detail here.

The control processor 50A may use machine learning to determine a method of controlling the vehicle devices 60, 70, 80, and 90 that are configured to respectively stimulate the sight, the hearing, the sense of touch, and the sense of smell of the occupant inside the vehicle and control the vehicle devices 60, 70, 80, and 90.

Details thereof will be described later.

[Configuration of Control Processor 50A]

Figure 8:
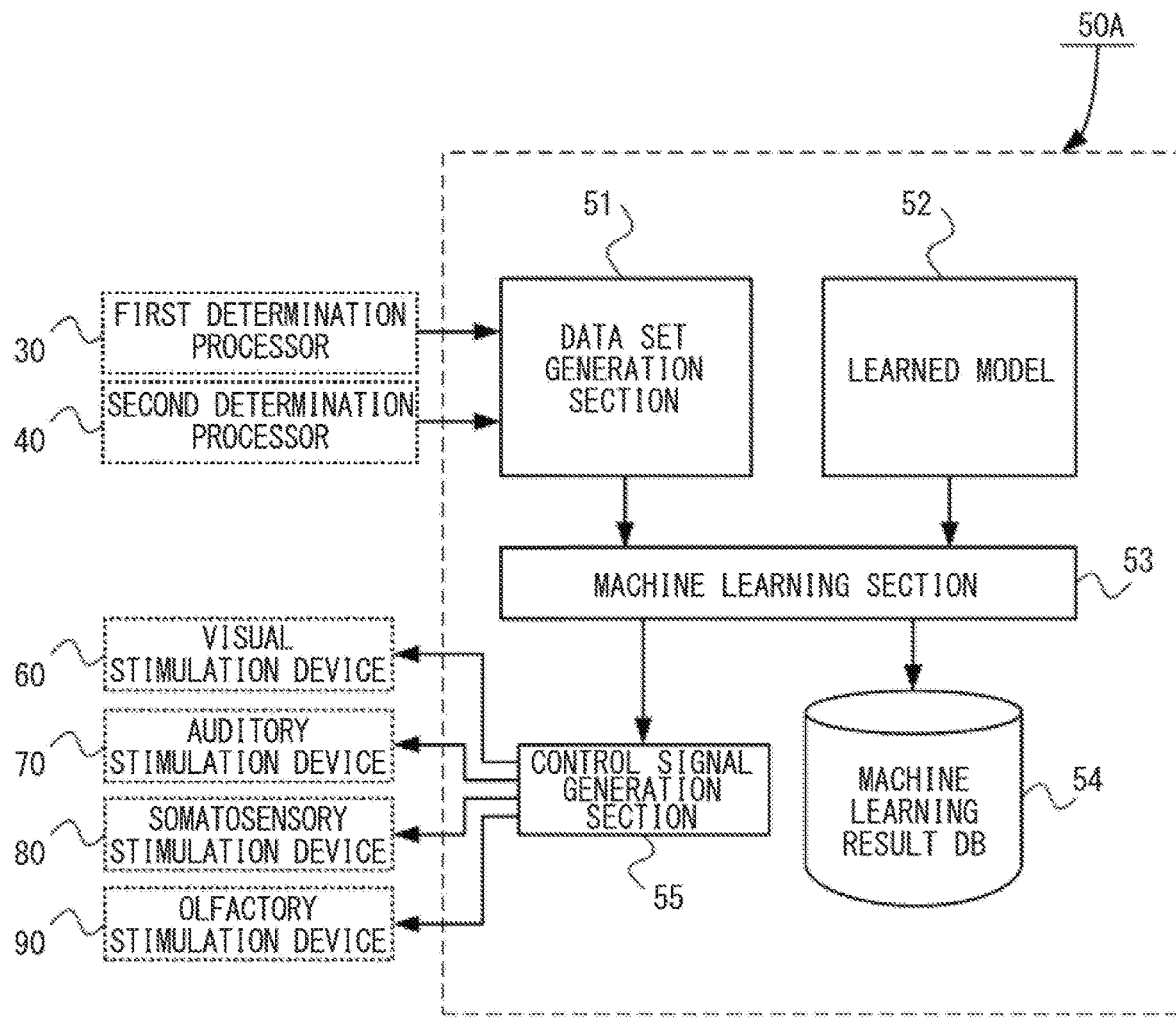
FIG. 8 is a diagram illustrating an example of a configuration of a control processor of the safety drive assist apparatus according to one example embodiment of the technology.

As illustrated in FIG. 8, the control processor 50A may include a data set generation section 51, a learned model 52, a machine learning section 53, a machine learning result database (DB) 54, and a control signal generation section 55.

The data set generation section 51 may generate a data set to be used by the machine learning section 53, on the basis of the determination information supplied from the first determination processor 30, the second determination processor 40, or both.

The learned model 52 may be generated by supplying pre-existing particular learning data to a neural network (NN) and performing deep learning.

Note that, in one example, the learned model may be generated on the basis of data stored in the later-described machine learning result database (DB) 54.

The machine learning section 53 may include the neural network (NN). The machine learning section 53 may use the data set generated by the data set generation section 51 as input data, and execute deep learning with use of the learned model 52. The machine learning section 53 may thereby output information of the method of controlling the vehicle devices 60, 70, 80, and 90.

For example, the machine learning section 53 may calculate a deviation of a score with respect to similarity between the data set generated by the data set generation section 51 and the learned model 52. In a case where the calculated deviation is a predetermined value or less, the machine learning section 53 may detect the method of controlling the vehicle devices 60, 70, 80, and 90 included in the learned model 52. Further, the machine learning section 53 may supply information of the detected controlling method to the control signal generation section 55, and store the information in the machine learning result database (DB) 54.

In one example, data such as an ID or personal information unique to the occupant may be associated with the data set generated by the data set generation section 51, and the data set and the associated ID or personal information may be used as the input to the machine learning section 53.

In one example, vehicle external environment information acquired from the external apparatus or the like including, without limitation, a season, a weather, a temperature, humidity, a time slot, a construction zone, accident information, and malfunctioning vehicle information may be included in the input to the machine learning section 53.

In one example, the learned model 52 may be generated by using, as learning data, data in which a data set generated by the data set generation section 51 after elapse of a predetermined time period and information such as the ID or the personal information unique to the occupant are associated with the data stored in the machine learning result database (DB) 54. The learned model 52 may be thus updated appropriately.

The machine learning result database (DB) 54 may receive via the machine learning section 53 and hold therein a data set in which the data set generated by the data set generation section 51 and the information of the method of controlling the vehicle devices 60, 70, 80, and 90 supplied from the machine learning section 53 are combined.

Note that the data set in which the data set generated by the data set generation section 51 and the information of the method of controlling the vehicle devices 60, 70, 80, and 90 supplied from the machine learning section 53 are combined may include the information such as the ID or the personal information unique to the occupant.

The control signal generation section 55 may generate, for example, respective unique control signals for the vehicle devices 60, 70, 80, and 90 on the basis of the information of the method of controlling the vehicle devices 60, 70, 80, and 90 supplied from the machine learning section 53, and output the generated unique control signals.

[Process of Safety Drive Assist Apparatus 1A]

Figure 9:
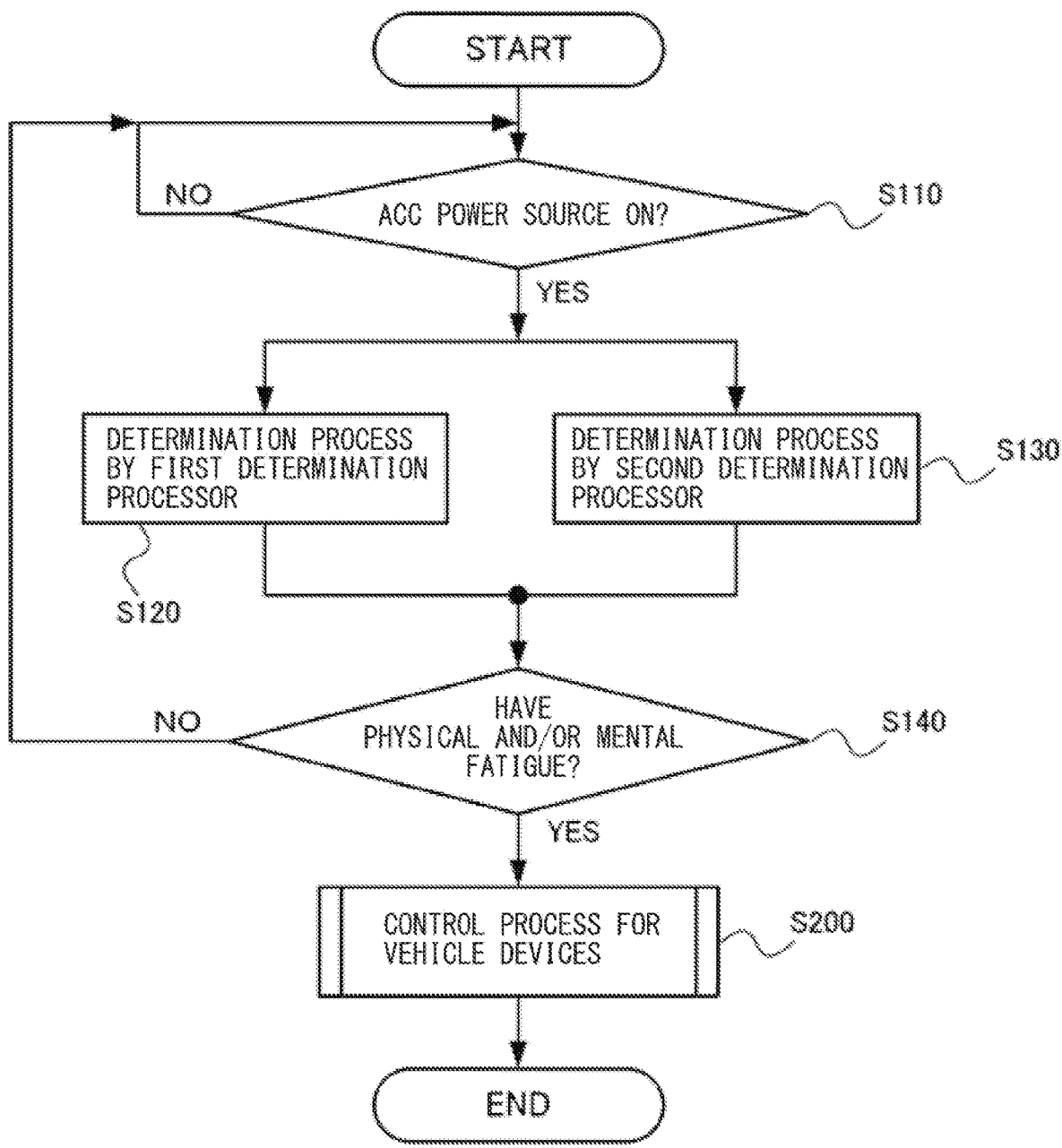
FIG. 9 is a flowchart illustrating an example of a process to be performed by the safety drive assist apparatus according to one example embodiment of the technology.
Figure 10:
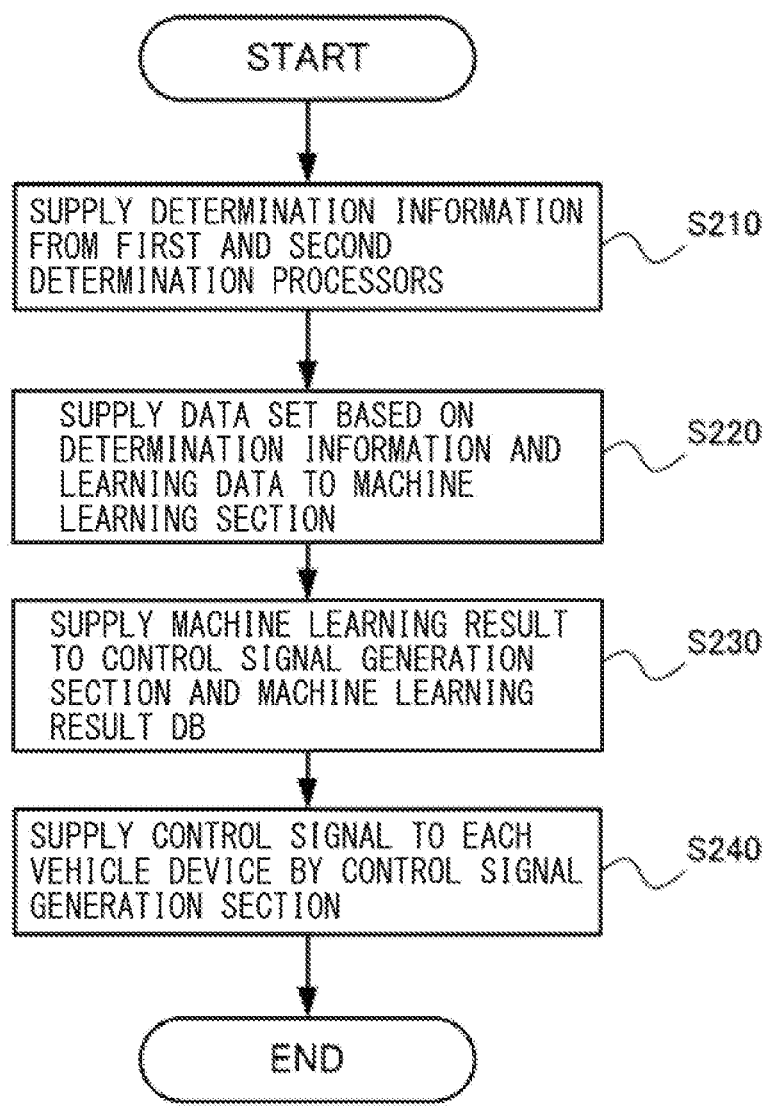
FIG. 10 is a flowchart illustrating an example of a process to be performed by a machine learning section of the safety drive assist apparatus according to one example embodiment of the technology.

Referring to FIGS. 9 and 10, a process to be performed by the safety drive assist apparatus 1A according to the second example embodiment is described.

As illustrated in FIG. 9, the process to be performed by the safety drive assist apparatus 1A according to the second example embodiment may differ from the process to be performed by the safety drive assist apparatus 1 according to the first example embodiment only by a process in step S200. Therefore, only the process in step S200 is described in detail below.

[Vehicle Device Control Process of Control Processor 50A]

As illustrated in FIG. 10, in a case where the control processor 50A determines that the occupant is experiencing the physical fatigue, the mental fatigue, or both on the basis of the determination information from the first determination processor 30, the second determination processor 40, or both (YES in step S140 in FIG. 9), the control processor 50A may supply, to the data set generation section 51, the determination information from the first determination processor 30, the second determination processor 40, or both (step S210).

The data set generation section 51 may generate a data set on the basis of the supplied determination information from the first determination processor 30, the second determination processor 40, or both, and supply the generated data set to the machine learning section 53 (step S220). In step 220, in addition, the machine learning section 53 may also take in the learned model 52.

The machine learning section 53 may use the data set generated by the data set generation section 51 as the input data, and execute machine learning with use of the learned model 52. The machine learning section 53 may thereby supply, to the control signal generation section 55, the information of the method of controlling the vehicle devices 60, 70, 80, and 90 as a learning result (step S230). In step S230, in addition, the machine learning section 53 may associate the information of the method of controlling the vehicle devices 60, 70, 80, and 90 as the learning result with the data set supplied from the data set generation section 51, and store the associated information of the controlling method and the data set in the machine learning result database (DB) 54.

The control signal generation section 55 may generate respective control signals unique to the vehicle devices 60, 70, 80, and 90, and output the generated control signals (step S240).

[Example Workings and Example Effects]

As described above, the control processor 50A of the safety drive assist apparatus 1A according to the second example embodiment may determine, by machine learning, the method of controlling the vehicle devices 60, 70, 80, and 90 that are configured to respectively stimulate the sight, the hearing, the sense of touch, and the sense of smell of the occupant inside the vehicle, and control the vehicle devices 60, 70, 80, and 90.

Therefore, the control processor 50A may execute the machine learning and thereby control the vehicle devices 60, 70, 80, and 90 that respectively stimulate the sight, the hearing, the sense of touch, and the sense of smell of the occupant inside the vehicle, on the basis of the determination information obtained by the first determination processor 30, the determination information obtained by the second determination processor 40, or both. Accordingly, it is possible to appropriately select the awakening method and appropriately adjust the degree of the awakening process. As a result, it is possible to reduce the possibility of accident occurrence due to fatigue.

Moreover, associating the information such as the ID or the personal information unique to the occupant with the data set generated by the data set generation section 51 and using the associated information and the data set as information to be inputted to the machine learning section 53 allow for a control based on the occupant. Accordingly, it is possible to appropriately select the awakening method and appropriately and uniquely adjust the degree of the awakening process in accordance with the occupant. As a result, it is possible to reduce the possibility of accident occurrence due to fatigue.

Moreover, including the vehicle external environment information including, without limitation, the season, the weather, the temperature, the humidity, the time slot, and the traffic conjunction situation in the above-described input information allows for a more appropriate control based on the occupant. Accordingly, it is possible to more appropriately select the awakening method and more appropriately and uniquely adjust the degree of the awakening process in accordance with the occupant. As a result, it is possible to reduce the possibility of accident occurrence due to fatigue.

Moreover, using, as the learning data, the data in which the data set generated by the data set generation section 51 after elapse of the predetermined time period and the information such as the ID or the personal information unique to the occupant are associated with the data stored in the machine learning result database (DB) 54 to appropriately update the learned model 52 makes it possible to more effectively select the awakening method and more effectively adjust the degree of the awakening process. As a result, it is possible to reduce the possibility of accident occurrence due to fatigue.

Third Example Embodiment

Figure 11:
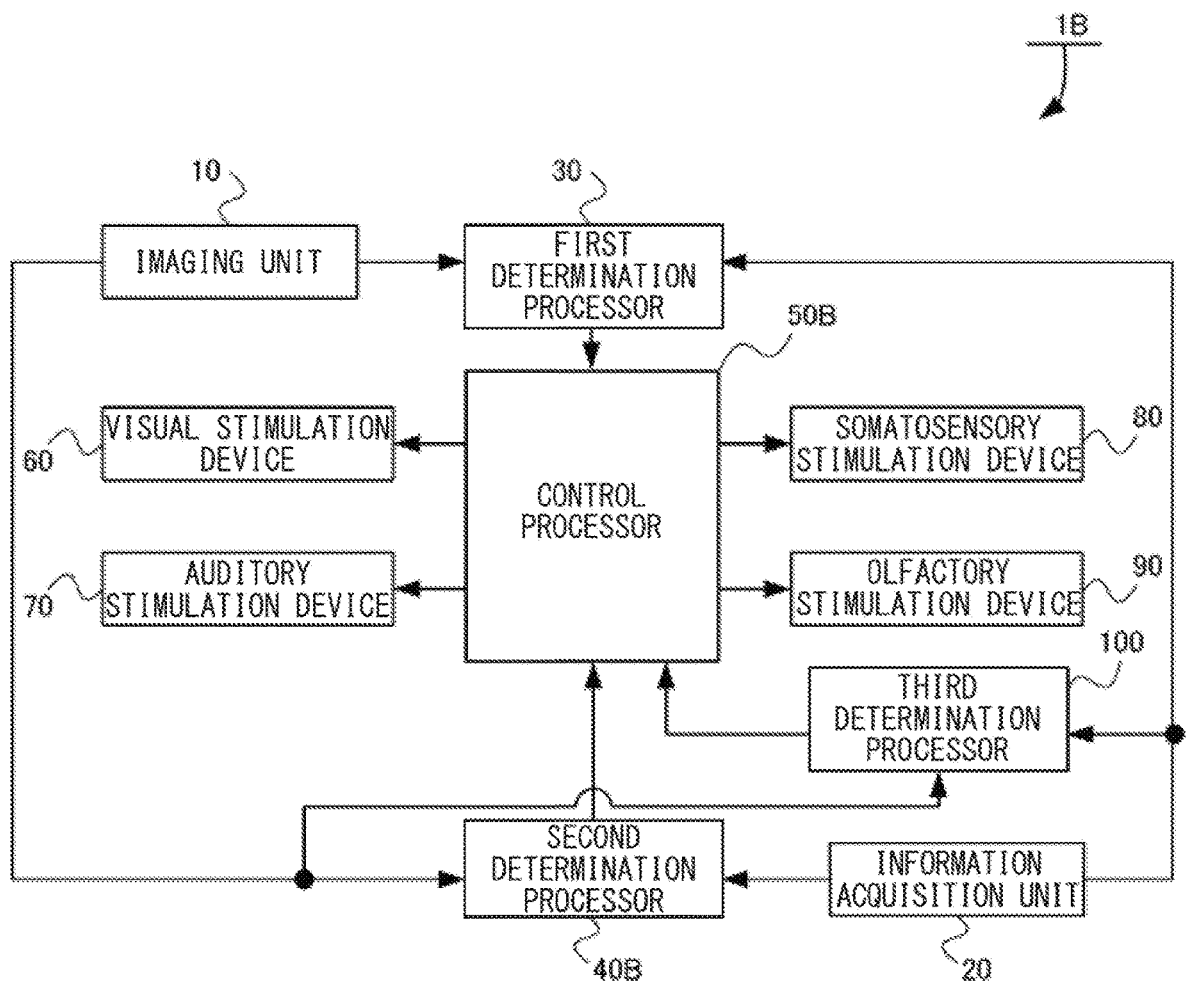
FIG. 11 is a diagram illustrating an example of a configuration of a safety drive assist apparatus according to one example embodiment of the technology.
Figure 12:
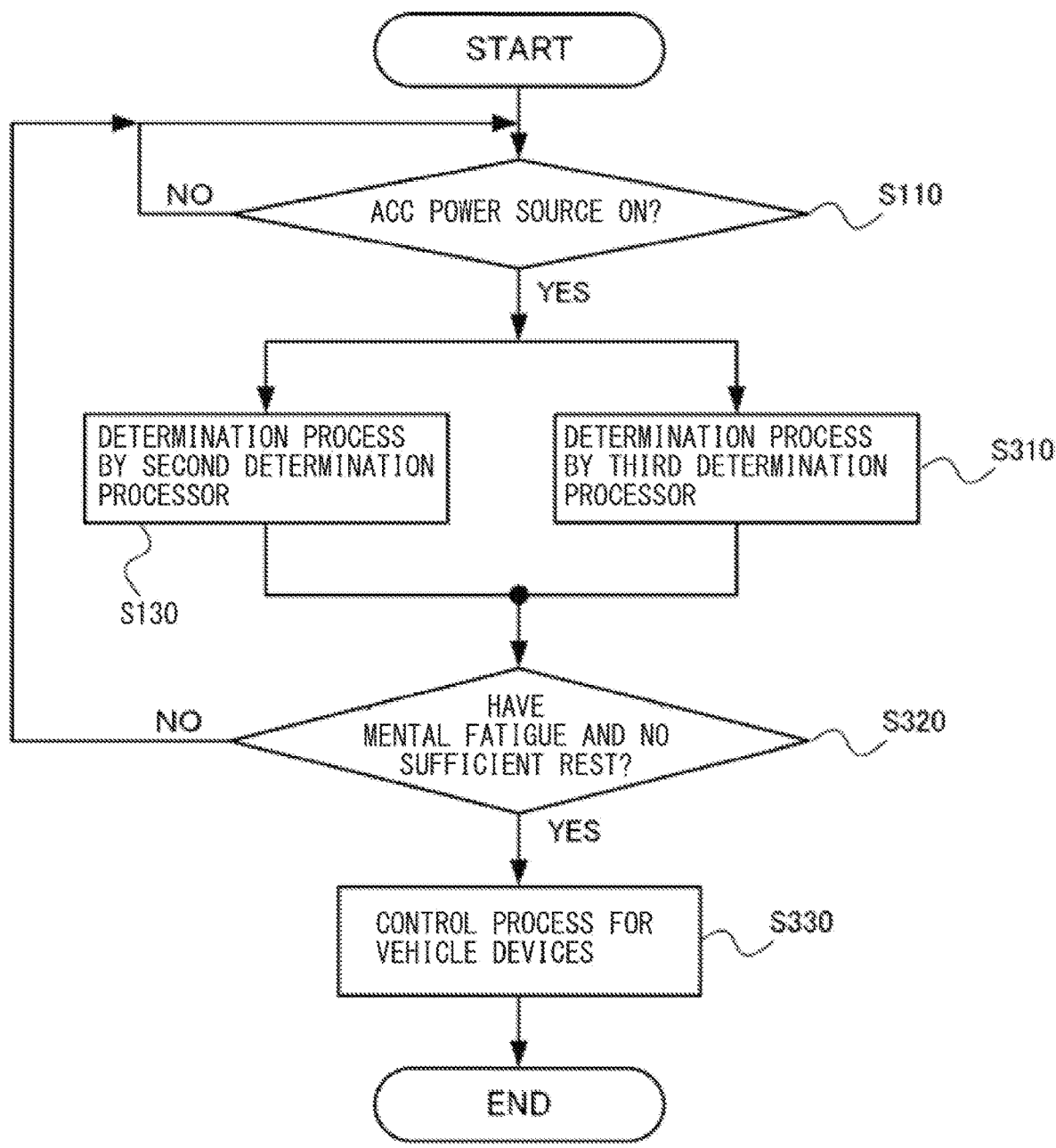
FIG. 12 is a flowchart illustrating an example of a process to be performed by the safety drive assist apparatus according to one example embodiment of the technology.

Referring to FIGS. 11 to 13, a safety drive assist apparatus 1B according to a third example embodiment of the technology is described.

[Configuration of Safety Drive Assist Apparatus 1B]

As illustrated in FIG. 11, the safety drive assist apparatus 1B according to the third example embodiment may include the imaging unit 10, the information acquisition unit 20, the first determination processor 30, a second determination processor 40B, a control processor 50B, the visual stimulation device 60, the auditory stimulation device 70, the somatosensory stimulation device 80, the olfactory stimulation device 90, and a third determination processor 100.

Note that the components denoted with the same referential signs as those in the first and the second example embodiments may serve as the same, and are therefore not described further in detail here.

The second determination processor 40B may determine the mental fatigue level of the occupant inside the vehicle on the basis of information obtained from the imaging unit 10, the information acquisition unit 20, or both. For example, the second determination processor 40B may determine the mental fatigue level of the occupant regarding, for example but not limited to, the heart rate, the heart rate variability, the respiratory rate, the body temperature, the blood pressure, the hemoglobin level, the number of times of blinking, the opening degree of an eye, and the vehicle external environment information.

For example, regarding the five evaluation levels used by the second determination processor 40B described in FIG. 13, the level may be set higher as the numerical value of the item is greater for the heart rate, the heart rate variability, the respiratory rate, the body temperature, the blood pressure, the hemoglobin level, and the number of times of blinking. The level may be set higher as the numerical value is smaller for the opening degree of an eye. For the vehicle external environment information, the level may be set higher as the situation is worse.

The third determination processor 100 may determine a rest state of the occupant inside the vehicle on the basis of the information obtained from the imaging unit 10, the information acquisition unit 20, or both. For example, the third determination processor 100 may determine the rest state of the occupant regarding, for example but not limited to, the activity amount, the sleep duration, the number of times of rolling while sleeping, the sleep state, and the rest duration. For example, the third determination processor 100 may determine the rest state from sleep state information including the sleep duration and the quality of sleep of the occupant acquired by the information acquisition unit 20. Further, the third determination processor 100 may determine the rest state, for example, from a moving image at a resting time of the occupant acquired by the imaging unit 10.

For example, regarding the five evaluation levels used by the third determination processor 100 described in FIG. 13, the level may be set higher as the numerical value of the item is greater for the activity amount, the number of times of rolling while sleeping, and the sleep state. The level may be set higher as the numerical value of the item is smaller for the sleep duration and the rest duration.

Non-limiting examples of the information to be obtained from the imaging unit 10 may include the rest duration, the sleep duration, and the number of times of rolling while sleeping. Non-limiting examples of the information to be obtained from the information acquisition unit 20 may include the rest duration, the sleep duration, the number of times of rolling while sleeping, and the sleep state including the quality of sleep.

In a case where the control processor 50B determines that the mental fatigue level of the occupant inside the vehicle is a predetermined fatigue level or higher, and the occupant has not taken a predetermined rest or more on the basis of the determination information obtained by the second determination processor 40B and the determination information obtained by the third determination processor 100, the control processor 50B may control the vehicle devices 60, 70, 80, and 90.

For example, the control processor 50B may determine that the mental fatigue level of the occupant is high in a case where the determination information obtained from the second determination processor 40B includes an information acquisition unit output item at a predetermined threshold level or higher based on the five-level evaluation. The predetermined threshold level may be, for example, level 4 of the five levels described in FIG. 13.

In the example described in FIG. 13, as the determination information obtained by the second determination processor 40B, the item of the opening degree of an eye is at the predetermined threshold level or higher. Therefore, the control processor 50B may determine that the occupant inside the vehicle is experiencing the mental fatigue.

In a case where the determination information obtained from the third determination processor 100 includes an information acquisition unit output item at a predetermined threshold level or higher based on the five-level evaluation, the control processor 50B may determine that the occupant has not taken the predetermined rest or more. The predetermined threshold level may be, for example, level 4 of the five levels described in FIG. 13.

In the example described in FIG. 13, as the determination information obtained by the third determination processor 100, the items of the activity amount, the sleep duration, and the sleep state are at the predetermined threshold level or higher. Therefore, the control processor 50B may determine that the occupant has not taken the predetermined rest or more.

Note that, for example, determination regarding the rest may be comprehensively made on the basis of not only the rest state while the vehicle is traveling but also, for example, the rest state on the previous day of the traveling day or during several weeks up to the traveling day. For example, the determination regarding the rest may be made mainly on the rest state in a period around the traveling day while taking into consideration whether the occupant has regularly rested in a predetermined period before the period around the traveling day.

[Process of Safety Drive Assist Apparatus 1B]

Referring to FIGS. 12 and 13, a process to be performed by the safety drive assist apparatus 1B according to the third example embodiment is described.

As illustrated in FIG. 12, the control processor 50B may first determine whether the accessory power source (ACC power source) is in the ON state (step S110).

In a case where the control processor 50B determines that the ACC power source is not in the ON state (NO in step S110), the safety drive assist apparatus 1B may transition to the standby mode.

In a case where the control processor 50B determines that the ACC power source is in the ON state (YES in step S110), the second determination processor 40B and the third determination processor 100 may each execute the determination process on the basis of information obtained from the imaging unit 10, the information acquisition unit 20, or both, and supply determination information to the control processor 50B (steps S130 and S310).

Here, as illustrated in FIG. 13, the second determination processor 40B and the third determination processor 100 may each perform the determination process regarding the respective items of the outputs from the information acquisition unit 20.

The control processor 50B may determine whether the mental fatigue level of the occupant is the predetermined fatigue level or higher and the occupant has not sufficiently rested on the basis of the determination information obtained from the second determination processor 40B and the third determination processor 100 (step S320).

In a case where the control processor 50B determines that the mental fatigue level of the occupant is not the predetermined fatigue level or higher and the occupant has sufficiently rested (NO in step S320), the control processor 50B may cause the process to move to step S110.

In a case where the control processor 50B determines that the mental fatigue level of the occupant is the predetermined fatigue level or higher and the occupant has not sufficiently rested (YES in step S320), the control processor 50B may cause the process to move to step S330.

For example, in the example described in FIG. 13, the opening degree of an eye is at level 4 or higher of the five levels described in FIG. 13. Accordingly, the control processor 50B may determine that the occupant is experiencing the mental fatigue. In addition, the activity amount, the sleep duration, and the sleep state are at level 4 or higher of the five levels described in FIG. 13. Accordingly, the control processor 50B may determine that the occupant has not sufficiently rested. Therefore, the control processor 50B may cause the process to move to step S330 in order to take measure for decreasing the mental fatigue level of the occupant and allowing the occupant to recover from the mental fatigue.

In step S330, the control processor 50B may execute a process of controlling the vehicle devices 60, 70, 80, and 90 that promote decreasing of the mental fatigue level of the occupant and allowing the occupant to recover from the mental fatigue on the basis of the determination information obtained from the second determination processor 40B and the third determination processor 100 (step S330).

For example, in a case where the determination information from the second determination processor 40B and the third determination processor 100 is as listed in FIG. 13, for example, as described in FIG. 6, the control processor 50B may so control the visual stimulation device 60 that the visual stimulation device 60 brings the sunroof into the open state in the case of daytime, and changes the interior light to blue light in the case of nighttime.

In addition, for example, the control processor 50B may so control the auditory stimulation device 70 that the auditory stimulation device 70 plays a natural sound.

In addition, for example, the control processor 50B may so control the somatosensory stimulation device 80 that the somatosensory stimulation device 80 presents how to perform massage promoting recovery from fatigue by means of an image or an audio sound.

In addition, for example, the control processor 50B may so control the olfactory stimulation device 90 that the olfactory stimulation device 90 generates the scent of the aroma oil promoting recovery from fatigue. After the control processor 50B executes the process of controlling the vehicle devices 60, 70, 80, and 90, the control processor 50B may end the series of processes.

Other than controlling the vehicle devices 60, 70, 80, and 90, the control processor 50B may switch the vehicle compartment ventilation mode to the outside air introduction mode and take in oxygen-rich air into the vehicle compartment to promote awakening of the occupant.

[Example Workings and Example Effects]

As described above, the safety drive assist apparatus 1B according to the third example embodiment may include the third determination processor 100 that determines the rest state of the occupant inside the vehicle. In a case where the control processor 50B determines that the mental fatigue level of the occupant inside the vehicle is the predetermined fatigue level or higher and the occupant has not taken the predetermined rest or more on the basis of the determination information obtained by the second determination processor 40B and the determination information obtained by the third determination processor 100, the control processor 50B may control the vehicle devices 60, 70, 80, and 90.

That is, the occupant may sometimes be experiencing fatigue more than the mental fatigue level calculated from the determination information from the second determination processor 40B, in a case: where the mental fatigue level of the occupant inside the vehicle is determined as being the predetermined fatigue level or higher on the basis of the determination information from the second determination processor 40B; and where the occupant has not slept sufficiently on the previous day of the traveling day, the occupant has not sufficiently and regularly slept for several days or several weeks up to the traveling day, or the occupant has not sufficiently rested while the vehicle is traveling.

Accordingly, in a case where the above-described conditions are satisfied, the control processor 50B may control the vehicle devices 60, 70, 80, and 90, making it possible to appropriately select the awakening method and appropriately adjust the degree of the awakening process in accordance with the mental fatigue level that the occupant is actually experiencing. As a result, it is possible to reduce the possibility of accident occurrence due to fatigue.

According to the first example embodiment, the second determination processor 40 may perform determination regarding items including the items used to determine the rest state, and the control processor 50 may comprehensively determine the mental fatigue level of the occupant on the basis of the determination information obtained by the second determination processor 40. In contrast, according to the third example embodiment, the second determination processor 40B may perform determination regarding items other than the items used to determine the rest state, and the third determination processor 100 may perform determination regarding the items used to determine the rest state. Further, in a case where the control processor 50B determines that the mental fatigue level of the occupant inside the vehicle is the predetermined fatigue level or higher and the occupant has not taken the predetermined rest or more on the basis of the determination information obtained by the second determination processor 40B and the determination information obtained by the third determination processor 100, the control processor 50B may control the vehicle devices 60, 70, 80, and 90.

Accordingly, by more appropriately determining the mental fatigue level that the occupant is actually experiencing, it is possible to appropriately select the awakening method and appropriately adjust the degree of the awakening process. As a result, it is possible to reduce the possibility of accident occurrence due to fatigue.

According to the third example embodiment, the third determination processor 100 may determine the rest state on the basis of the information including the sleep duration and the quality of sleep of the occupant acquired by the information acquisition unit 20.

That is, the sleep state before the traveling may be determined, for example, on the basis of the information obtained by a unit such as a sensor provided on the bed, the sealing, or the like at home.

Accordingly, the control processor 50B may perform multifaceted determination of the mental fatigue level of the occupant on the traveling day on the basis of the determination information obtained by the second determination processor 40B and the determination information obtained by the third determination processor 100. This makes it possible to appropriately determine the mental fatigue level that the occupant is actually experiencing, making it possible to more appropriately select the awakening method and more appropriately adjust the degree of the awakening process. As a result, it is possible to reduce the possibility of accident occurrence due to fatigue.

According to the third example embodiment, the third determination processor 100 may determine the rest state on the basis of the moving image at the resting time of the occupant acquired by the imaging unit 10.

Accordingly, the control processor 50B may perform multifaceted determination of the mental fatigue level of the occupant on the traveling day on the basis of the determination information obtained by the second determination processor 40B and the determination information obtained by the third determination processor 100. This makes it possible to appropriately determine the mental fatigue level that the occupant is actually experiencing, making it possible to appropriately select the awakening method and appropriately adjust the degree of the awakening process. As a result, it is possible to reduce the possibility of accident occurrence due to fatigue.

Fourth Example Embodiment

Referring to FIGS. 14 to 17, a safety drive assist apparatus 1C according to a fourth example embodiment of the technology is described.

[Configuration of Safety Drive Assist Apparatus 1C]

Figure 14:
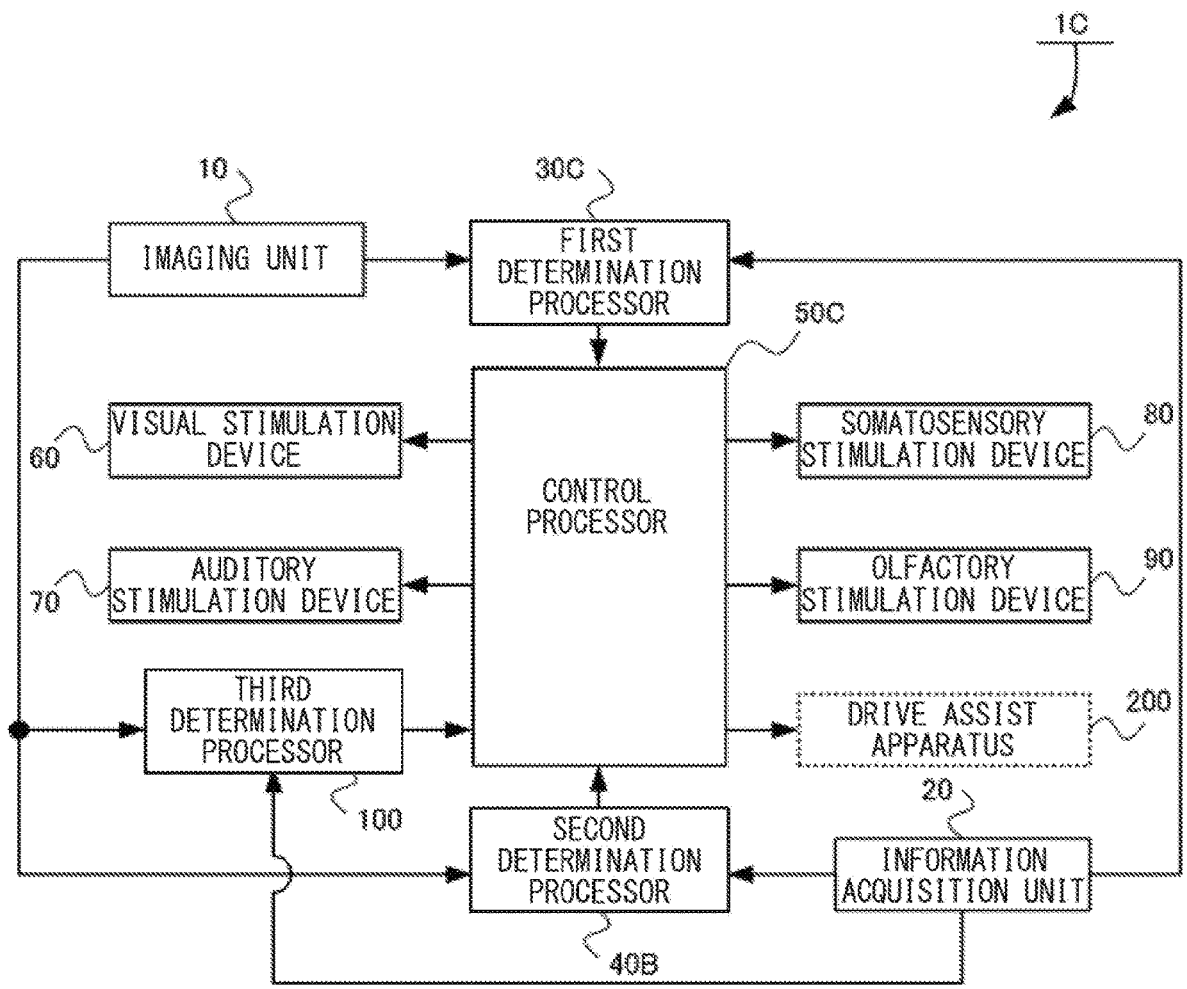
FIG. 14 is a diagram illustrating an example of a configuration of a safety drive assist apparatus according to one example embodiment of the technology.

As illustrated in FIG. 14, the safety drive assist apparatus 1C according to the fourth example embodiment may include the imaging unit 10, the information acquisition unit 20, a first determination processor 30C, the second determination processor 40B, a control processor 50C, the visual stimulation device 60, the auditory stimulation device 70, the somatosensory stimulation device 80, the olfactory stimulation device 90, and the third determination processor 100.

Note that the components denoted with the same referential signs as those in the first to the third example embodiments may serve as the same, and are therefore not described further in detail here.

The first determination processor 30C may determine the physical fatigue level of the occupant inside the vehicle on the basis of information obtained from the imaging unit 10, the information acquisition unit 20, or both. For example, the first determination processor 30C may determine the physical fatigue level of the occupant regarding, for example but not limited to, the blood-oxygen saturation, the respiratory rate, the body temperature, the blood pressure, the hemoglobin level, the activity amount, the number of times of blinking, the opening degree of an eye, and the vehicle external environment information.

The control processor 50C may supply, to a drive assist apparatus 200 provided outside the safety drive assist apparatus 1C, a control signal based on determination information obtained by at least one of the first determination processor 30C, the second determination processor 40B, or the third determination processor 100.

For example, in a case where the control processor 50C determines that the physical fatigue level of the occupant is a predetermined fatigue level or higher and the occupant has not taken a predetermined rest or more on the basis of the determination information obtained by the first determination processor 30C and the determination information obtained by the third determination processor 100, the control processor 50C may supply the control signal based on the determination information to the drive assist apparatus 200 provided outside the safety drive assist apparatus 1C.

Figure 17:
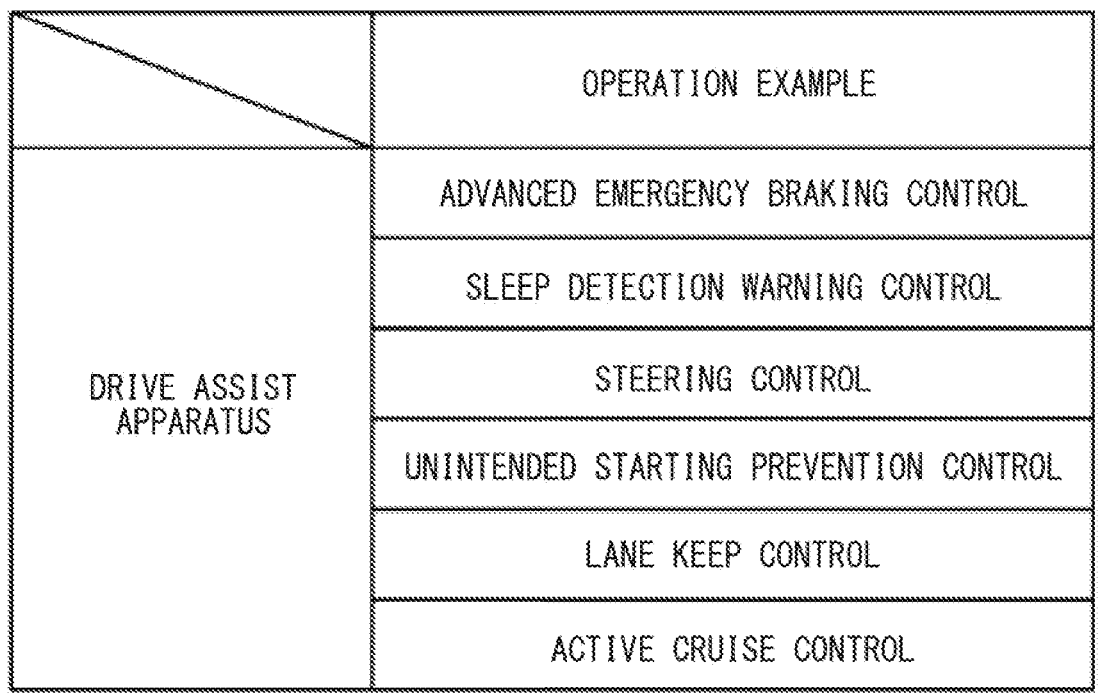
FIG. 17 is a diagram illustrating an example of operation to be performed by a drive assist apparatus related to the safety drive assist apparatus according to one example embodiment of the technology.

Non-limiting examples of a control which the control processor 50C causes the drive assist apparatus 200 provided outside the safety drive assist apparatus 1C to perform may include, as listed in FIG. 17: an advanced emergency braking control; a sleep detection warning control of presenting a warning at a timing earlier than a usual timing by changing a warning threshold for sleep detection; a steering control of preventing an electric power steering system from performing abrupt steering compared with an actual steering operation; an unintended starting prevention control; a lane keep control; and an active cruise control (ACC).

Further, for example, in a case where the control processor 50C determines that the mental fatigue level of the occupant inside the vehicle is a predetermined fatigue level or higher and the occupant has not taken a predetermined rest or more on the basis of the determination information obtained by the second determination processor 40B and the determination information obtained by the third determination processor 100, the control processor 50C may control the vehicle devices 60, 70, 80, and 90 that promote decreasing of the mental fatigue level.

[Process of Safety Drive Assist Apparatus 1C]

Figure 15:
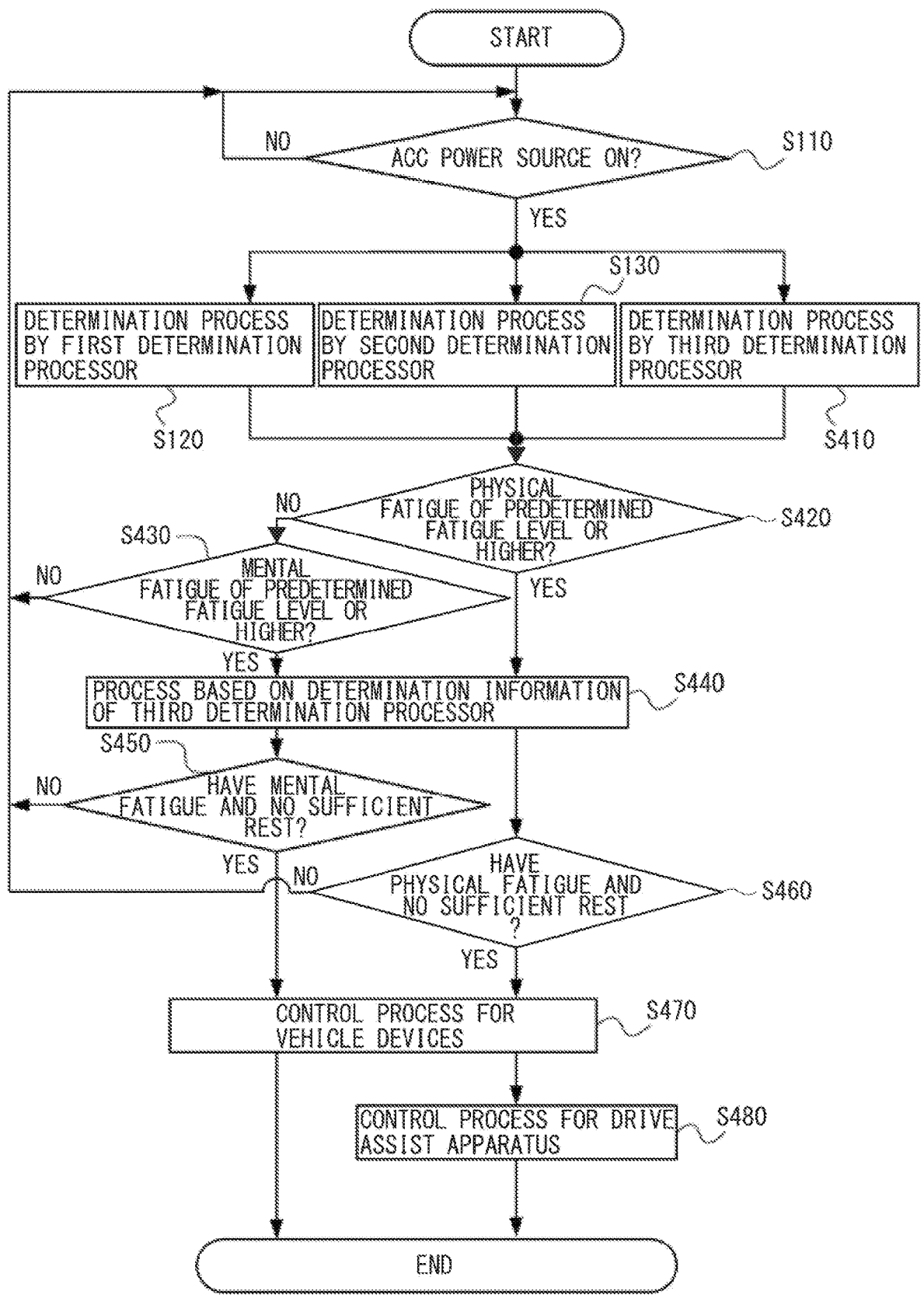
FIG. 15 is a flowchart illustrating an example of a process to be performed by the safety drive assist apparatus according to one example embodiment of the technology.

Referring to FIGS. 15 to 17, a process to be performed by the safety drive assist apparatus 1C according to the fourth example embodiment is described.

As illustrated in FIG. 15, the control processor 50C may first determine whether the accessory power source (ACC power source) is in the ON state (step S110).

In a case where the control processor 50C determines that the ACC power source is not in the ON state (NO in step S110), the safety drive assist apparatus 1C may transition to the standby mode.

In a case where the control processor 50C determines that the ACC power source is in the ON state (YES in step S110), the first determination processor 30C, the second determination processor 40B, and the third determination processor 100 may each execute the determination process on the basis of information obtained from the imaging unit 10, the information acquisition unit 20, or both, and supply determination information to the control processor 50C (steps S120, S130, and S410).

Here, as illustrated in FIGS. 13 and 16, the first determination processor 30C, the second determination processor 40B, and the third determination processor 100 may perform the determination process regarding the respective items of the outputs from the information acquisition unit 20.

For example, the first determination processor 30C may determine the physical fatigue level of the occupant regarding, for example but not limited to, the blood-oxygen saturation, the respiratory rate, the body temperature, the blood pressure, the hemoglobin level, the activity amount, the number of times of blinking, the opening degree of an eye, and the vehicle external environment information. For example, the second determination processor 40B may determine the mental fatigue level of the occupant regarding, for example but not limited to, the heart rate, the heart rate variability, the respiratory rate, the body temperature, the blood pressure, the hemoglobin level, the number of times of blinking, the opening degree of an eye, and the vehicle external environment information.

For example, the third determination processor 100 may determine the rest state of the occupant regarding, for example but not limited to, the activity amount, the sleep duration, the number of times of rolling while sleeping, the sleep state including the quality of sleep, and the rest duration.

The control processor 50C may determine whether the physical fatigue level of the occupant is a predetermined fatigue level or higher on the basis of the determination information on the basis of the determination information from the first determination processor 30C (step S420).

In a case where the control processor 50C determines that the physical fatigue level of the occupant is not the predetermined fatigue level or higher (NO in step S420), the control processor 50C may determine whether the mental fatigue level of the occupant is a predetermined fatigue level or higher on the basis of the determination information from the second determination processor 40B (step S430).

In a case where the control processor 50C determines that the mental fatigue level of the occupant is not the predetermined fatigue level or higher (NO in step S430), the control processor 50C may cause the process to move to step S110.

In a case where the control processor 50C determines that the mental fatigue level of the occupant is the predetermined fatigue level or higher (YES in step S430), the control processor 50C may execute a process based on the determination information obtained by the third determination processor 100 (step S440), and determine whether the mental fatigue level of the occupant is the predetermined fatigue level or higher and the occupant has taken a predetermined rest or more (step S450). In a case where the control processor 50C determines that the mental fatigue level of the occupant is the predetermined fatigue level or higher but the occupant has taken the predetermined rest or more (NO in step S450), the control processor 50C may cause the process to move to step S110.

In a case where the control processor 50C determines that the mental fatigue level of the occupant is the predetermined fatigue level or higher and the occupant has not taken the predetermined rest or more (YES in step S450), the control processor 50C may execute the process of controlling the vehicle devices 60, 70, 80, and 90 that promote decreasing of the mental fatigue level of the occupant and allowing the occupant to recover from the mental fatigue, on the basis of the determination information obtained by the second determination processor 40B (step S470).

For example, in a case where the determination information obtained by the second determination processor 40B is as listed in FIG. 16, for example, as described in FIG. 6, the control processor 50C may so control the visual stimulation device 60 that the visual stimulation device 60 brings the sunroof into the open state in the case of daytime, and decreases the luminance of the interior light or changes the chroma thereof to a warm color in the case of nighttime.

In addition, for example, the control processor 50C may so control the auditory stimulation device 70 that the auditory stimulation device 70 plays a natural sound.

In addition, for example, the control processor 50C may so control the somatosensory stimulation device 80 that the somatosensory stimulation device 80 presents how to perform massage promoting recovery from fatigue by means of an image or an audio sound.

In addition, for example, the control processor 50C may so control the olfactory stimulation device 90 that the olfactory stimulation device 90 generates a scent of an aroma oil promoting recovery from fatigue. After the control processor 50C executes the process of controlling the vehicle devices 60, 70, 80, and 90, the control processor 50C may end the series of processes.

In a case where the control processor 50C determines that the physical fatigue level of the occupant is the predetermined fatigue level or higher in step S420 (YES in step S420), the control processor 50C may execute the process based on the determination information obtained by the third determination processor 100 (step S440).

The control processor 50C may determine whether the physical fatigue level of the occupant is a predetermined fatigue level or higher and whether the occupant has taken a predetermined rest or more, on the basis of a result of the process in step S440 (step S460). In a case where the control processor 50C determines that the physical fatigue level of the occupant is the predetermined fatigue level or higher but the occupant has taken the predetermined rest or more (NO in step S460), the control processor 50C may cause the process to move to step S110.

In a case where the control processor 50C determines that the physical fatigue level of the occupant is the predetermined fatigue level or higher and the occupant has not taken the predetermined rest or more (YES in step S460), the control processor 50C may execute the process of controlling the vehicle devices 60, 70, 80, and 90 that promote decreasing of the physical fatigue level of the occupant and allowing the occupant to recover from the physical fatigue, on the basis of the determination information obtained by the second determination processor 40B (step S470).

In addition, the control processor 50C may supply a control signal based on the determination information obtained by the third determination processor 100 to the drive assist apparatus 200 to control the drive assist apparatus 200 (step S480). For example, the control processor 50C may so control the drive assist apparatus 200 that the drive assist apparatus 200 executes any of non-limiting examples of the control including: the advanced emergency braking control; the sleep detection warning control of presenting a warning at a timing earlier than a usual timing by changing a warning threshold for sleep detection; the steering control of preventing the electric power steering system from performing abrupt steering compared with an actual steering operation; the unintended starting prevention control; the lane keep control; and the active cruise control (ACC).

[Example Workings and Example Effects]

As described above, the safety drive assist apparatus 1C according to the fourth example embodiment may include the third determination processor 100 that determines the rest state of the occupant inside the vehicle. In a case where the control processor 50C determines that the mental fatigue level of the occupant inside the vehicle is the predetermined fatigue level or higher and the occupant has not taken the predetermined rest on the basis of the determination information obtained by the second determination processor 40B and the determination information obtained by the third determination processor 100, the control processor 50C may control the vehicle devices 60, 70, 80, and 90.

That is, the occupant may sometimes be experiencing fatigue more than the mental fatigue level calculated from the determination information obtained by the second determination processor 40B, for example, in a case: where the mental fatigue level of the occupant inside the vehicle is determined as being the predetermined fatigue level or higher on the basis of the determination information obtained by the second determination processor 40B; and where the occupant has not slept sufficiently on the previous day of the traveling day, the occupant has not sufficiently and regularly slept for several days or several weeks up to the traveling day, or the occupant has not sufficiently rested while the vehicle is traveling.

Accordingly, in a case where the above-described conditions are satisfied, the control processor 50C may control the vehicle devices 60, 70, 80, and 90, making it possible to appropriately select the awakening method and appropriately adjust the degree of the awakening process in accordance with the mental fatigue level that the occupant is actually experiencing. As a result, it is possible to reduce the possibility of accident occurrence due to fatigue.

Moreover, in a case where the control processor 50C of the safety drive assist apparatus 1C according to the fourth example embodiment determines that the physical fatigue level of the occupant is the predetermined fatigue level or higher and the occupant has not taken the predetermined rest or more on the basis of the determination information obtained by the first determination processor 30C and the determination information obtained by the third determination processor 100, the control processor 50C may control the vehicle devices 60, 70, 80, and 90 that promote decreasing of the physical fatigue level and supply the control signal based on the determination information to the drive assist apparatus 200.

That is, in a case: where the physical fatigue level of the occupant inside the vehicle is determined as being the predetermined fatigue level or higher on the basis of the determination information obtained by the first determination processor 30C; and where the occupant has not slept sufficiently on the previous day of the traveling day, the occupant has not sufficiently and regularly slept for several days or several weeks up to the traveling day, or the occupant has not sufficiently rested while the vehicle is traveling, the control processor 50C may control the vehicle devices 60, 70, 80, and 90 that promote decreasing of the physical fatigue level, and supply the control signal based on the determination information to the drive assist apparatus 200 in order to reduce a physical load.

Accordingly, in a case where the above-described conditions are satisfied, the control processor 50C may control the vehicle devices 60, 70, 80, and 90 and also control the drive assist apparatus 200, making it possible to appropriately select the awakening method and appropriately adjust the degree of the awakening process in accordance with the mental fatigue level that the occupant is actually experiencing, while reducing the physical load on the occupant and suppressing a decrease in physical fatigue level. As a result, it is possible to reduce the possibility of accident occurrence due to fatigue.

According to the first example embodiment, the first determination processor 30, the second determination processor 40, or both may perform the determination regarding the items including the items used to determine the rest state, and the control processor 50 may comprehensively determine the mental fatigue level of the occupant on the basis of the determination information obtained by the first determination processor 30, the second determination processor 40, or both. According to the fourth example embodiment, the first determination processor 30C, the second determination processor 40B, or both may perform the determination regarding items other than the items used to determine the rest state, and the third determination processor 100 may perform the determination regarding the items used to determine the rest state. Further, in a case where the control processor 50C determines that the mental fatigue level of the occupant inside the vehicle is the predetermined fatigue level or higher and the occupant has not taken the predetermined rest or more on the basis of the determination information obtained by the second determination processor 40B and the determination information obtained by the third determination processor 100, the control processor 50C may control the vehicle devices 60, 70, 80, and 90. Alternatively, in a case where the control processor 50C determines that the physical fatigue level of the occupant is the predetermined fatigue level or higher and the occupant has not taken the predetermined rest or more on the basis of the determination information obtained by the first determination processor 30C and the determination information obtained by the third determination processor 100, the control processor 50C may supply the control signal based on the determination information to the drive assist apparatus 200.

Accordingly, by more appropriately determining the mental fatigue level that the occupant is actually experiencing, it is possible to appropriately select the awakening method and appropriately adjust the degree of the awakening process. As a result, it is possible to reduce the possibility of accident occurrence due to fatigue.

[Modifications]

For example, the above example embodiments each have been described referring to a configuration in which the first determination processor 30 or 30C, the second determination processor 40 or 40B, and the control processor 50, 50A, 50B, or 50C are provided in the corresponding one of the safety drive assist apparatuses 1, 1A, 1B, and 1C. However, this is non-limiting. One example embodiment may have a configuration in which the information from the imaging unit 10 and the information from the information acquisition unit 20 are transferred to a server coupled to the vehicle, and the determination process performed by the first determination processor 30 or 30C, the determination process performed by the second determination processor 40 or 40B, and the control process performed by the control processor 50, 50A, 50B, or 50C may be executed in the server.

This configuration may allow for quick processing of more information to appropriately select the awakening method and appropriately adjust the degree of the awakening process. As a result, it is possible to reduce the possibility of accident occurrence due to fatigue.

Moreover, the above example embodiments each have been described referring to an example where the biometric information acquired by the information acquisition unit 20 is as listed in FIG. 4; however, this is non-limiting. For example, information including, without limitation, brain waves, an amount of sweat, a temperature of skin, and a blood glucose level may be acquired, and any combination of the various pieces of biometric information may be used to determine fatigue.

Note that the safety drive assist apparatus according to an embodiment of the technology may be implementable by: recording the process to be performed by the control processor 50, 50A, 50B, or 50C in a recording medium readable by a computer system; and causing the control processor 50, 50A, 50B, or 50C to read the program recorded in the recording medium to execute the program. The above-mentioned computer system encompasses an operating system (OS) and hardware such as a peripheral apparatus.

In a case where the world wide web (WWW) system is used, the above-mentioned "computer system" encompasses a website provision environment or a website display environment. Further, the above-mentioned program may be transferred from the computer system having a storage device or the like holding the program to another computer system via a transfer medium or a transfer wave in the transfer medium. As used herein, the term "transfer medium" that transfers the program refers to a medium configured to transfer information, for example, a network (a communication network) such as the Internet or a communication line (a communication wire) such as a telephone line.

Moreover, the above-mentioned program may implement a portion of the above-described process.

Moreover, a combination of the above-mentioned program and another program pre-recorded in the computer system may implement the above-described process. That is, the above-mentioned program may be a differential file (a differential program).

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to one example embodiment of the technology, the control processor may determine, by means of machine learning, the method of controlling the vehicle devices that are configured to stimulate the sight, the hearing, the sense of touch, and the sense of smell of the occupant inside the vehicle and control the vehicle devices.

One or more example embodiments of the technology achieve an effect that it is possible to appropriately select an awakening method and appropriately adjust a degree of an awakening process in accordance with physical and mental fatigue levels of an occupant based on a plurality of determination factors, making it possible to reduce a possibility of accident occurrence due to fatigue.

Each of the information acquisition unit 20, the first determination processors 30 and 30C, the second determination processors 40 and 40B, the control processors 50, 50A, 50B, and 50C, the data set generation section 51, the machine learning section 53, the control signal generation section 55, and the third determination processor 100 illustrated in any of FIGS. 2, 7, 8, 11, and 14 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the information acquisition unit 20, the first determination processors 30 and 30C, the second determination processors 40 and 40B, the control processors 50, 50A, 50B, and 50C, the data set generation section 51, the machine learning section 53, the control signal generation section 55, and the third determination processor 100 illustrated in any of FIGS. 2, 7, 8, 11, and 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the information acquisition unit 20, the first determination processors 30 and 30C, the second determination processors 40 and 40B, the control processors 50, 50A, 50B, and 50C, the data set generation section 51, the machine learning section 53, the control signal generation section 55, and the third determination processor 100 illustrated in any of FIGS. 2, 7, 8, 11, and 14.

The invention claimed is:

1. A safety drive assist apparatus for a vehicle, the safety drive assist apparatus comprising:
    an imaging unit configured to capture an image of an occupant inside the vehicle;
    an information acquisition unit configured to acquire information including biometric information of the occupant inside and outside the vehicle;
    a first determination processor configured to:
        obtain first items from the image of the occupant inside the vehicle, and second items from the information of the occupant inside and outside the vehicle;
        quantify the first and second items based on threshold values related to physical fatigue; and
        determine a physical fatigue level of the occupant inside the vehicle based on the quantified first and second items;
    a second determination processor configured to:
        obtain third items from the image of the occupant inside the vehicle, and fourth items from the information of the occupant inside and outside the vehicle, wherein the first items include items that are common to those in the third items, and wherein the second items include items that are common to those in the fourth items;
        quantify the third and fourth items based on threshold values related to mental fatigue; and
        determine a mental fatigue level of the occupant inside the vehicle based on the quantified third and fourth items; and
    a control processor configured to control a vehicle device of the vehicle on a basis of one or both of first determination information obtained by the first determination processor upon determining the physical fatigue level, and second determination information obtained by the second determination processor upon determining the mental fatigue level,
    wherein the vehicle device includes:
        a first device configured to stimulate sight of the occupant inside the vehicle;
        a second device configured to stimulate hearing of the occupant inside the vehicle;
        a third device configured to stimulate a sense of touch of the occupant inside the vehicle; and
        a fourth device configured to stimulate a sense of smell of the occupant inside the vehicle, and
    wherein the first device is configured to have functionalities including controlling a sunroof of the vehicle to open to allow external light to enter inside the vehicle.

2. The safety drive assist apparatus according to claim 1, wherein the vehicle device is configured to stimulate sight, hearing, a sense of touch, and a sense of smell of the occupant inside the vehicle.

3. The safety drive assist apparatus according to claim 2, further comprising
    a third determination processor configured to determine a rest state of the occupant inside the vehicle, wherein
    the control processor is configured to output, to the vehicle device, a control signal based on the determination information and third determination information obtained by the third determination processor upon determining that the physical fatigue level of the occupant is a predetermined level or higher and the occupant has not taken a predetermined rest or more on a basis of the first determination information and the third determination information.

4. The safety drive assist apparatus according to claim 3, wherein the control processor is configured to control the vehicle device in a case where the control processor determines that the mental fatigue level of the occupant inside the vehicle is a predetermined level or higher and the occupant has not taken the predetermined rest or more on a basis of the second determination information and the third determination information.

5. The safety drive assist apparatus according to claim 3, wherein the third determination processor is configured to determine the rest state on the basis of the information including sleep duration and quality of sleep of the occupant acquired by the information acquisition unit.

6. The safety drive assist apparatus according to claim 3, wherein the third determination processor is configured to determine the rest state on a basis of an image at a resting time of the occupant acquired by the imaging unit.

7. The safety drive assist apparatus according to claim 1, further comprising
    a third determination processor configured to determine a rest state of the occupant inside the vehicle on the basis of the image of the occupant inside the vehicle captured by the imaging unit or the information including the biometric information of the occupant inside and outside the vehicle acquired by the information acquisition unit, wherein
    the control processor is configured to control the vehicle device upon determining that the mental fatigue level of the occupant inside the vehicle is a predetermined level or higher and the occupant has not taken a predetermined rest or more on a basis of the second determination information and third determination information obtained by the third determination processor upon determining the rest state.

8. The safety drive assist apparatus according to claim 7, wherein the third determination processor is configured to determine the rest state on the basis of the information including sleep duration and quality of sleep of the occupant acquired by the information acquisition unit.

9. The safety drive assist apparatus according to claim 7, wherein the third determination processor is configured to determine the rest state on a basis of an image at a resting time of the occupant acquired by the imaging unit.

10. The safety drive assist apparatus according to claim 1, wherein
the vehicle device comprises a drive assist apparatus configured to assist a driving operation of the vehicle performed by a driver who drives the vehicle, and
the control processor is configured to output, to the drive assist apparatus, a control signal based on one or both of the first determination information and the second determination information.

11. The safety drive assist apparatus according to claim 1, further comprising
a third determination processor configured to determine a rest state of the occupant inside the vehicle, wherein
the control processor is configured to output, to the vehicle device, a control signal based on the determination information and third determination information obtained by the third determination processor upon determining that the physical fatigue level of the occupant is a predetermined level or higher and the occupant has not taken a predetermined rest or more on a basis of the first determination information and the third determination information.

12. The safety drive assist apparatus according to claim 11, wherein the control processor is configured to control the vehicle device in a case where the control processor determines that the mental fatigue level of the occupant inside the vehicle is a predetermined level or higher and the occupant has not taken the predetermined rest or more on a basis of the second determination information and the third determination information.

13. The safety drive assist apparatus according to claim 11, wherein the third determination processor is configured to determine the rest state on the basis of the information including sleep duration and quality of sleep of the occupant acquired by the information acquisition unit.

14. The safety drive assist apparatus according to claim 11, wherein the third determination processor is configured to determine the rest state on a basis of an image at a resting time of the occupant acquired by the imaging unit.

15. A safety drive assist apparatus for a vehicle, the safety drive assist apparatus comprising:
an imaging unit configured to capture an image of an occupant inside the vehicle; and
circuitry configured to:
acquire information including biometric information of the occupant inside and outside the vehicle;
obtain first items from the image of the occupant inside the vehicle, and second items from the information of the occupant inside and outside the vehicle;
quantify the first and second items based on threshold values related to physical fatigue;
determine a physical fatigue level of the occupant inside the vehicle based on the quantified first and second items;
obtain third items from the image of the occupant inside the vehicle, and fourth items from the information of the occupant inside and outside the vehicle, wherein the first items include items that are common to those in the third items, and wherein the second items include items that are common to those in the fourth items;
quantify the third and fourth items based on threshold values related to mental fatigue; and
determine a mental fatigue level of the occupant inside the vehicle based on the quantified third and fourth items; and
control a vehicle device of the vehicle on a basis of one or both of first determination information regarding the physical fatigue level, and second determination information regarding the mental fatigue level,
wherein the vehicle device includes:
a first device configured to stimulate sight of the occupant inside the vehicle;
a second device configured to stimulate hearing of the occupant inside the vehicle;
a third device configured to stimulate a sense of touch of the occupant inside the vehicle; and
a fourth device configured to stimulate a sense of smell of the occupant inside the vehicle, and
wherein the first device is configured to have functionalities including controlling a sunroof of the vehicle to open to allow external light to enter inside the vehicle.

16. A safety drive assist apparatus for a vehicle, the safety drive assist apparatus comprising:
an imaging unit configured to capture an image of an occupant inside the vehicle;
a first information acquisition unit, installed inside the vehicle, configured to acquire information including biometric information of the occupant inside the vehicle;
a second information acquisition unit, installed inside a residence of the occupant, configured to acquire information including biometric information of the occupant outside the vehicle;
a first determination processor configured to determine a physical fatigue level of the occupant inside the vehicle on a basis of the image of the occupant inside the vehicle captured by the imaging unit or the information including the biometric information of the occupant inside and outside the vehicle acquired by the first and second information acquisition units;
a second determination processor configured to determine a mental fatigue level of the occupant inside the vehicle on the basis of the image of the occupant inside the vehicle captured by the imaging unit or the information including the biometric information of the occupant inside and outside the vehicle acquired by the first and second information acquisition units; and
a control processor configured to control a vehicle device of the vehicle on a basis of one or both of first determination information obtained by the first determination processor upon determining the physical fatigue level, and second determination information obtained by the second determination processor upon determining the mental fatigue level,
wherein the vehicle device includes:
a first device configured to stimulate sight of the occupant inside the vehicle;
a second device configured to stimulate hearing of the occupant inside the vehicle;
a third device configured to stimulate a sense of touch of the occupant inside the vehicle; and
a fourth device configured to stimulate a sense of smell of the occupant inside the vehicle, and
wherein the first device is configured to have functionalities including controlling a sunroof of the vehicle to open to allow external light to enter inside the vehicle.

* * * * *